US012532135B2

(12) United States Patent
Pedersen et al.

(10) Patent No.: US 12,532,135 B2

(45) Date of Patent: Jan. 20, 2026

(54) HEARING AID AND METHOD

(71) Applicant: Oticon A/S, Smørum (DK)

(72) Inventors: Michael Syskind Pedersen, Smørum (DK); Fares El-Azm, Smørum (DK); Adam Kuklasiński, Smørum (DK); Sam Nees, Smørum (DK); Sigurdur Sigurdsson, Smørum (DK); Silvia Tarantino, Smørum (DK)

(73) Assignee: Oticon A/S, Smørum (DK)

( * ) Notice: Subject to any disclaimer, the term of this patent is extended or adjusted under 35 U.S.C. 154(b) by 225 days.

(21) Appl. No.: 18/403,762

(22) Filed: Jan. 4, 2024

(65) Prior Publication Data

US 2024/0236587 A1 Jul. 11, 2024

(30) Foreign Application Priority Data

Jan. 6, 2023 (EP) ..................................... 23150573

(51) Int. Cl.
*H04R 25/00* (2006.01)

(52) U.S. Cl.
CPC ......... *H04R 25/552* (2013.01); *H04R 25/405* (2013.01); *H04R 25/507* (2013.01); *H04R 2225/021* (2013.01); *H04R 2430/23* (2013.01)

(58) Field of Classification Search
CPC .... H04R 25/40; H04R 25/405; H04R 25/407; H04R 25/43; H04R 25/505; H04R 2225/43; H04R 2430/20
See application file for complete search history.

(56) References Cited

U.S. PATENT DOCUMENTS

| | | | | |
|---|---|---|---|---|
| 9,980,055 | B2 * | 5/2018 | Jensen | G01S 3/8083 |
| 10,848,880 | B2 * | 11/2020 | De Vries | H04R 25/554 |
| 10,951,978 | B2 * | 3/2021 | Matsuo | H04R 3/005 |
| 11,109,163 | B2 * | 8/2021 | Pedersen | H04R 3/007 |
| 11,418,892 | B2 * | 8/2022 | Wurzbacher | G01C 21/188 |
| 12,185,059 | B2 * | 12/2024 | Donjon | H04R 1/406 |
| 2015/0156578 | A1 * | 6/2015 | Alexandridis | H04R 3/005 381/92 |
| 2019/0110137 | A1 * | 4/2019 | Udesen | H04R 25/552 |
| 2022/0236360 | A1 * | 7/2022 | Cordourier Maruri | G01S 3/8083 |

FOREIGN PATENT DOCUMENTS

| | | | |
|---|---|---|---|
| CN | 111163411 A * | 5/2020 | H04R 25/43 |
| EP | 3253075 | 12/2017 | |
| EP | 3300078 | 3/2018 | |
| EP | 3373602 | 9/2018 | |
| EP | 3413589 | 12/2018 | |
| WO | 01/87011 | 11/2001 | |

* cited by examiner

*Primary Examiner* — Ryan Robinson

(57) ABSTRACT

Disclosed herein are embodiments of a method performed by a hearing aid and a hearing aid including one or more processors, a memory, two or more microphones, and an output transducer. The hearing aid is configured to generate a first processed signal (y) based on input signals from the two or more microphones and a steering value, wherein a target direction is associated with the steering value. The steering value can be changed depending on certain criterion.

20 Claims, 9 Drawing Sheets

HEARING AID AND METHOD

CROSS REFERENCE TO RELATED APPLICATIONS

Any and all application for which a foreign or domestic priority claim is identified in the Application Data Sheet as filed with the present application are hereby incorporated by reference under 37 CFR 1.57.

FIELD

The present disclosure relates to a method performed by a hearing aid and to a hearing aid. The hearing aid and the method provides e.g., improved stability of a dynamically determined target direction e.g., in connection with spatial filtering e.g., using beamforming.

BACKGROUND

Hearing aids have a small size (form factor) and sits during normal use at a user's one ear or in case of binaural hearing aids at both ears e.g., behind a user's ear and/or in the user's ear canal e.g., entirely in the ear canal. Only a very limited battery power budget is available to keep the hearing aid(s) operating throughout a full day. For these and other reasons, hearing aids have limited processing power.

Hearing aids with beamforming provides spatial filtering based on spaced-apart microphones, e.g., at the hearing aid, to suppress noisy sounds from the surroundings relative to sounds from a so-called target direction, a target zone, and/or a target location. Beamforming is often characterized by one or more beams spatially characterizing where sounds are suppressed and where sounds are 'passed through' or enhanced at least relative to the suppressed sounds. The beam is located about one or more target directions and/or locations.

The target direction may be in front of the user, also known as a 'look direction', or the target direction may be at another, e.g., slightly different, direction, to the sides or even from the back. When the user of the hearing aid is in a conversation with another person, the beam (at the target direction) should be at the other person.

In beamforming, it is generally an objective to find a good trade-off between extensive spatial noise suppression of sounds from the surroundings and only limited spatial noise suppression. On the one hand, extensive spatial noise suppression comes at the cost of reducing the user's ability to hear what is happening around her/him. On the other hand, only limited spatial noise suppression may cause disturbing sound levels especially since hearing aids typically enhances sounds, at least in some, e.g., higher, frequencies. The latter may effectively reduce the available gain for hearing loss compensation (also denoted fitting gain).

In respect of beamforming in hearing aids, the target direction was conventionally a fixed direction relative to the microphones, typically straight in front of the user, hence the use of the term 'look direction'.

More recently, beamforming in hearing aids is configured with a steerable beam that can be moved to, e.g., any, among predefined directions and/or locations, hence the term 'steering direction' is used. Beamformers in hearing aids may therefore be provided with a steering input to change the target direction to any target direction e.g., to any of predefined target directions. In this respect it is a technical challenge to automatically determine the steering input to locate the beam at a location ideally coinciding with the location(s) of one or more target sound sources, e.g., one or more conversation partners. Especially, it is an objective to find a good trade-off between keeping a target direction and shifting the target direction e.g., to capture another target sound source or a moving target sound source.

PRIOR ART

EP3300078-A1 discloses a method for determining a Direction-of-Arrival, DOA, in connection with beamforming based on microphone signals.

EP3413589-A1 discloses a method for determining a Direction-of-Arrival, DOA, using a maximum likelihood estimate in connection with beamforming based on microphone signals is disclosed in. It is described that the maximum likelihood estimate is based on estimated covariance matrixes including a noise covariance matrix and a target covariance matrix. However, to provide a stable focus of the beamformer, e.g., via a stable look direction, the covariance matrixes may be smoothed using adjusted, e.g., using adaptively adjusted, smoothing of the covariance matrixes.

EP3253075-A1 describes adaptive co-variance matrix estimation.

It remains however an object to device a good trade-off between keeping a target direction and shifting the target direction.

SUMMARY

There is provided:

A method performed by a hearing aid including one or more processors, a memory, two or more microphones, and an output transducer; comprising:

- generating a first processed signal (y) based on input signals from the two or more microphones and a steering value; wherein a target direction is associated with the steering value;
- supplying a signal (o) to the output transducer based on the first processed signal (y);
- for each steering value (s; d), comprised by multiple steering values, computing a first value ($\mathcal{L}(\theta)$); wherein the first value ($\mathcal{L}(\theta)$) is associated with a likelihood of an acoustic sound signal arriving from the target direction associated with the steering value;
- determining at least one salient first value ($\mathcal{L}^*(\theta)$) among the multiple first values and determining a steering value (s*) associated with the at least one salient first value ($\mathcal{L}^*(\theta)$); and
- computing a second value (H(θ)) associated with variability of at least some of the multiple first values;
- determining to change the first steering value (s*) in response to a determination that the second value (H(θ)) satisfies at least a first criterion; and accordingly:
  - generating the first processed signal (y) based on the steering value (s*) associated with the at least one salient first value ($\mathcal{L}^*(\theta)$).

An advantage is the provision of a more stable, less fluctuating steerable, target direction. The target direction may however be shifted when it is determined that there is sufficient evidence, based on the variability of the first values, to support a decision to shift the target direction e.g., away from a present target direction. This greatly improves the sound quality perceived by a user, e.g., a hearing-impaired person, of the hearing aid. Thus, a candidate first steering value is determined, and it is determined to update the first steering value based on the candidate first steering value. In this respect, the candidate first steering value is the steering value associated with the at least one salient first value. In some respects, the first steering value is set to the value of the steering value associated with the at least one salient first value. It is noted that the determination to change the first steering value is different from determining the value of the first steering value.

Herein, the term target direction is understood to include a direction and/or a position and/or a zone, which may be defined with respect to a 2D or 3D space. Whether to construe target direction as a direction, position or zone, may be in correspondence with a structure and/or optimization of the beamformer.

The first values may also be denoted likelihood values. The terms are used interchangeably herein. The first values may be an approximation of or a coarse or pragmatic estimate of likelihood values.

A more stable, steerable, target direction stabilizes the sound image presented to the user e.g., by reducing sound artefacts, such as fluctuating levels of background noise, associated with undesired modulation effects. In particular, the amount or frequency of changing the spatial location of the beamformer beam can typically be reduced.

Another advantage is reduction of the risk of suppressing a signal from a sound source, e.g., a speaking person, the user wishes to pay attention to. The risk is particularly reduced in situations wherein the likelihood values in some periods of time have about the same value, i.e., low variability. Situations at risk include when two or more of the likelihood values alternately assumes a maximum value despite of a e.g., a speaking person and the user's head (hearing aid) remaining in substantially fixed positions and orientations. In this respect, an advantage is reduction of problems related to a potentially diminishing signal-to-noise ratio, which may even turn negative. Thus, the risk of a sound source getting unintentionally suppressed, while the noise level is increased is reduced.

The method enables setting the first threshold such that a desired confidence level for changing the spatial location is reached before enabling a change in the spatial location of the beam. Computing a second value associated with variability of the first value across different target directions, enables requiring that the second value is greater than a first threshold before updating/changing the first steering value.

The method also enables that the target direction is steered away from a present target direction (only) when the second value, associated with variability of the multiple first values, satisfies the first criterion e.g., when the second value indicates a variability greater than a threshold variability value. Values greater than the threshold variability may be associated with at least one first value being significantly greater than an average of the first values, e.g., greater than the average plus margin value.

The beamformer may modify the phase and/or amplitude of one or more of its input signals to provide at its output a signal wherein an acoustic signal from a target direction is enhanced by constructive interference over acoustic signals from at least some directions other than the target direction.

The steering value may control a target direction by modifying the phase. Beamformer weight values may control the amplitude and are optimized with respect to e.g., minimizing distortion and/or signal-to-noise ratio of the signal from the target direction.

In some respects, the beamforming is based on a combination of an omnidirectional beamformer and a target-cancelling beamformer (e.g., using a so-called delay-and-sum beamformer and a delay-and-subtract beamformer). The first steering value may control the target-cancelling direction. In some respects, however, the first steering value may control a beam location and/or direction.

In some aspects, the salient first value ($\pounds^*(\theta)$) is a greatest value among the multiple first values.

The greatest value is conveniently identified as a maximum value. The maximum or minimum value can be determined using conventional methods. The salient value(s) may be the greatest value(s) in embodiments wherein the first values are directly representing likelihood or probability. Usually, probability values sum to one-point-zero (1.0). Likelihood values may sum to a constant value different from one-point-zero.

In some respects, however, the first values or a subset thereof may have negative values, or the first values may have a reciprocal relation to the likelihood values or probability values.

In some embodiments the second value is computed based on one or more of:

- a variance of the first values;
- an estimate of entropy ($H(\theta)$) of the first values, e.g., an approximated estimate of entropy ($H(\theta)$) of the first values;
- a difference between a greatest value among the first values and an average or median value of the first values;
- a difference between a smallest value among the first values and an average or median value of the first values;
- a sum of absolute deviations from an average value of the first values;
- a difference between a third value and a fourth value; wherein the third value is based on one or more greatest values of the first values; and wherein the fourth value is based on one or more values different from the one or more greatest values.

An advantage is that the second value provides a useful measure of how well the likelihood values, i.e., the first values, serve as a basis for shifting the target direction to a different target direction.

As an alternative to estimating the entropy, it may be advantageous simply to compare all the likelihood values (likelihood values are at least proportional to the probabilities). If all the likelihood values are similar, e.g., falling in a predefined range, the target direction is not updated. Only if one or a few likelihood values are greater than the other estimated likelihood values, the target direction is updated. Thus, the target direction can be updated based on the amount of peakiness of the likelihood values. This may be computationally cheaper than calculating the entropy. Peakiness could e.g., be based on the difference between a maximum likelihood value probability and the average likelihood value.

In some respects, the one or more values different from the one or more greatest values includes one or more lowest values among the first values and/or includes an average or median value of the first values.

In some embodiments, the first processed signal is generated using one or both of beamforming based on input signals from the two or more microphones and the steering value, and spatial filtering based on input signals from the two or more microphones and the steering value.

In some aspects, the second value is computed based on:

- a statistical test value indicating that the first values are drawn from a first distribution; wherein the first distribution has a skewness towards lower values; or a statistical measure of divergence between the first values and a distribution of values including a skewness towards lower values The statistical test may be a Kolmogorov-Smirnov test or another statistical test. The statistical measure of divergence may be based on a Kullback-Leibler divergence or another statistical measure of divergence.

In some aspects, the method comprises:

electing a set of fifth values which includes multiple greatest values among the first values;

wherein the second value (H(θ)) is associated with variability of the fifth values.

An advantage is that peakiness can be determined for the greatest values only, while disregarding lowermost values. In some respects, the set of fifth values includes the greatest N values, wherein N is an integer greater than two, e.g., N=4 or e.g., N is greater than 4 e.g., N=8. The first values not included in the fifth values may be disregarded at least for determining the second value i.e., disregarded for determining variability. Alternatively, the multiple greatest values among the first values may include values greater than a median value or an average value of the first values.

The variability of the fifth values may be determined using the same techniques as for determining the variability of the first values. Since it is the greatest first values that represent the most likely target directions, the determination that the second value (H(θ)) satisfies the first criterion may more reliably discriminate between a situation wherein the steering value is to be updated versus a situation wherein the steering value is to be not updated.

In some embodiments, the method comprises:

for one or more elected frequency bands comprised by multiple frequency bands:

computing the first values;

determining at least one salient first value ($\mathcal{L}$*(θ)) among the multiple first values; and setting the first steering value (s*) as a common value at least for the one or more elected frequency bands based on the steering value (s) associated with the at least one salient first value ($\mathcal{L}$*(θ)) for each of the one or more elected frequency bands.

An advantage is that the first steering value is a common value based on each of the one or more elected frequency bands.

In some respects, the input signals are split into multiple frequency bands e.g., by a so-called analysis filter bank or by a Fast Fourier Transformation, FFT. A decision to update the first steering value can be performed by electing one or more frequency bands known to likely be more indicative of whether to update the first steering value or not. The one or more elected frequency bands may include one or more lowermost frequency bands, excluding uppermost frequency bands. The one or more elected frequency bands may include one or more intermediate frequency bands between, and excluding, one or more lowermost frequency bands and one or more uppermost frequency bands.

In some aspects, the method comprises:

setting the first steering value (s*) at least for the one or more elected frequency bands based on determining that the steering value (s) associated with the at least one salient first value ($\mathcal{L}$*(θ)) agrees, or approximately agrees, to the same value for at least some of the elected frequency bands.

An advantage is that stability is further improved by requiring at least some agreement on a candidate first steering value across frequency bands. The candidate steering value is the steering value associated with the at least one salient first value.

In some respects, a requirement for setting the first steering value is that at least a first number of steering values must agree to the same value. The first number may be e.g., be two, three, four, five, six, however, less than all the elected frequency bands.

The method may include forgoing setting the first steering value, if the steering value associated with the at least one salient first value fails to agree to the same value for at least some of the elected frequency bands.

In some aspects the method comprises determining that the steering value (s) associated with the at least one salient first value ($\mathcal{L}$*(θ)) agrees to the same value for at least some of the elected frequency bands, is based on a voting principle.

An advantage is that stability is further improved. The first steering value may be set based on a voting principle, e.g., a weighted voting principle wherein each frequency band votes by the at least one salient first value. The voting principle may require a predetermined degree of majority.

In some embodiments the method comprises:

determining to change the first steering value (s*) based on a determination that at least two of the salient first values ($\mathcal{L}$*(θ)) at different frequency bands agrees to a common value.

An advantage is that a condition for changing the first steering value is that there is at least some agreement to the steering value across frequency bands. An advantage is that stability in the target direction is further improved by requiring that the estimated target directions for two or more frequency bands must agree. In some respects, the first criterion is satisfied if, for a majority of the elected frequency bands, the spatial indication associated with the at least one salient first value agrees to the same spatial indication.

It is noted that the determination to change the first steering value is different from determining the value of the first steering value.

In some embodiments, the method comprises:

for each of two or more elected frequency bands of multiple frequency bands:

computing the first values ($\mathcal{L}$(θ));

computing the second value (H(θ));

determining to change the first steering value (s*) in response to a determination that, for each of the two or more elected frequency bands, the second value (H(θ)), satisfies the first criterion, or determining to change the first steering value (s*) in response to a determination that, a predefined number of second values (H(θ)) satisfies the first criterion.

An advantage is that a decision to update the at least one steering value can be based on elected frequency bands. The elected of the multiple frequency bands includes less than all the multiple frequency bands.

In some embodiments, the method comprises:

applying weighing values (WH) to the first values to obtain modified first values; wherein each weighing value is associated with a frequency band;

wherein the second value (H(θ)) is associated with variability of the modified first values.

An advantage is that variability of the likelihood values at different frequency bands can be weighted differently depending on e.g., prior knowledge of how important a frequency band is for determining the target direction. In some respects, some lowermost frequency bands are weighted higher than at least some uppermost frequency bands.

The weighing values may be multibit values e.g., real numbers or integer numbers. Alternatively, the weighing values may be single bit values effectively electing the first values for some frequency bands and forgo electing the first values for other frequency bands.

In some respects, the first values are computed for elected frequency bands only and not computed for not-elected frequency bands.

In some aspects, the method comprises:

forgo updating the first steering value (s) in response to the second value satisfying a second criterion different from the first criterion.

An advantage is forgoing shifting the location of the beamforming beam in situations wherein the likelihood values do not satisfy the second criterion e.g., in situations wherein the likelihood values are inconclusive or only weakly conclusive. The second criterion may be complementary to the first criterion. The first criterion may include that the first value is less than a first threshold, whereas the second criterion may include that the first value is greater than the first threshold. One or both the first criterion and the second criterion may include threshold values. The first criterion may include a first threshold value that is different from a second threshold value included in the second criterion.

Also in this respect, an advantage is the provision of a more stable target direction, while enabling shifting the target direction when there is sufficient evidence, based on the likelihood values, supporting the decision to shift the location.

In some aspects, the first criterion includes a first threshold value (T1); and wherein the first criterion is satisfied when the second value (H(θ)) is greater than the first threshold value (T1).

An advantage is that the first criterion can be evaluated efficiently. However, in embodiments wherein the first values include negative values or values reciprocal to likelihood values or probability values, the first criterion is correspondingly satisfied when the second value is less than the first threshold value.

In some aspects, the memory includes the multiple first values and the steering values; and wherein the multiple first values are ordered correspondingly with the steering values.

An advantage is that the spatial indication (θ*) need not be explicitly stored as a value. Further, memory space may be saved. In some respects, the memory stores a list including list items, wherein each list item includes at least a pair of a first value, and a steering value associated the first value. The list may be a linked list, a dictionary, or another data structure. In some respects, the first values and the steering values are stored in one-to-one relations.

In some aspects, the multiple first values, and the steering values are ordered correspondingly with an ascending or descending order of a polar coordinate value of a target direction associated with a steering value.

An advantage is that, in the memory, neighbouring pairs of steering values and likelihood values correspond with (and are associated with) neighbouring spatial directions and/or locations. For instance, for neighbouring spatial directions ordered like 0°, 45°, 90°, . . . , 270°, 315°, the associated steering values and corresponding first values may be stored in the same, corresponding order. The spatial indications need not be stored in the memory.

ssIn some aspects, the method comprises: setting the steering value ( ) is based on a distance weighing value; wherein the distance weighing value increases the chance of setting a steering value ( ) associated with a target direction proximate to a current target direction, rather than distant from a current target direction.

ssAn advantage is that the target direction is stabilized about or close to a present target direction thereby reducing the risk of a widely fluctuating target direction.

The distance weighing value may serve as a penalty on more distant target directions, rather than on more proximate target directions.

In some embodiments the memory includes bias values (B) corresponding with the first values, and wherein the bias values include at least a first bias value; comprising:

before determining at least one salient first value ($\mathcal{L}$*(θ)) among the multiple first values, changing at least one of the first values based on the at least one first bias value; or determining the at least one salient first value ($\mathcal{L}$*(θ)) based on the first values and the bias values corresponding with the first values.

An advantage is that determining the target direction is biased to e.g., a pre-set or an otherwise set direction. A pre-set target direction may be a direction e.g., straight in front of the user or another direction.

Another advantage is a trade-off between, on the one hand, dynamically shifting the target direction and, on the other hand, biasing the dynamically shifting to at least increase the probability of reverting a pre-set target direction, e.g., in front of the user, in absence of evidence to use another target direction.

In some respects, the memory includes one or more bias values, each associated with a spatial indication. In some respects, a bias value is stored for each spatial indication. The bias values may be multiplicative or additive with respect to the first values.

In some aspects the bias values include at least one maximum value and/or at least one minimum value; wherein the at least one maximum value and/or at least one minimum value is/are arranged to correspond with a pre-set target direction.

The pre-set target direction may be a direction straight in front of the user or at another pre-set direction. The bias values may then increase the chance of the target direction being at the pre-set direction e.g., in front of the user.

When depicted according to a clockwise or counter-clockwise change of orientation relative to the user, the bias values corresponding with the steering values and in turn the target directions may show greater values at and proximal to the pre-set direction, while showing smaller values distant to the pre-set direction. The bias values may show smooth values e.g., like one or more bell shapes peaking at one or more pre-set directions and/or linear portions with an apex at the one or more pre-set directions. In some respects, the bias values show a box-like shape including e.g., only a few different values, e.g., only two different values.

In some embodiments, the memory includes bias values corresponding with the first values, and wherein the bias values include at least a first bias value; comprising:

applying at least the first bias value to at least some first values; wherein the at least some first values is/are associated with a first target direction; wherein the first target direction is a pre-set target direction.

An advantage is the increased tendency to set a steering value, changing the target direction—or reverting the target direction—to the pre-set spatial indication. Thus, the chance of the target direction returning to the pre-set spatial indication is increased.

In an example the first values, the likelihood values, peaks about a target direction e.g., 30 degrees to the right; then, after some time, the likelihood values flatten out and show low variability. Especially, at times when the likelihood values have flattened out and show low variability, the biased values can increase the tendency to set a steering value, changing the target direction to the pre-set spatial indication. The pre-set spatial indication may be associated with a direction straight in front of the user. The direction straight in front of the user may be denoted a look direction.

The bias values may be obtained by enhancing the first values associated with the pre-set spatial indication relative to the first values associated with other than the pre-set spatial indication. The augmenting of at least some of the first values may include weighing and/or adding/subtracting values. So, the bias may be multiplicative or additive. The bias may be linear or non-linear over time and/or across spatial indications.

The pre-set spatial indication may include one or more spatial indications. The one or more spatial indications may be grouped about one or more spatial indications. The augmentation may be based on monotonically increasing or decreasing values about the one or more pre-set spatial indications. The pre-set indication may be set during manufacture of the hearing aid and/or during a fitting session and/or via a user interface e.g., via an app running on an electronic device e.g., a smart phone, connected via a wireless connection to the hearing aid.

The bias values may be separate from or individually accessible from the first values. The bias values and the first values may be stored in a one-to-one relation e.g., in a list wherein each row includes a bias value and a first value.

In some aspects the pre-set target direction is controlled via a user interface of an app and/or via a user interface of fitting software running on an electronic device.

An advantage is that the user and/or a hearing care professional using the fitting software can set and or change the pre-set target direction via a user interface. The electronic device may in wireless communication with the hearing aid as it is known in the art.

In some embodiments, the memory includes bias values corresponding with the first values, and wherein the bias values include at least a first bias value, comprising:

- determining a signal-to-noise ratio value based on the first processed signal;
- determining that the signal-to-noise ratio value fails to satisfy a third criterion and accordingly:
  - augmenting at least some of the first values to include biased first values at least for values associated with a pre-set target direction; or
  - changing at least one first value of the first values based on and corresponding with the at least one first bias value.

An advantage is the increased tendency to set a steering value that changes the target direction to the pre-set spatial indication at times when the signal-to-noise ratio is e.g., below a threshold signal-to-noise value e.g., below a threshold signal-to-noise value of 3 dB, 0 dB or −3 dB. Other threshold signal-to-noise values can be chosen.

The third criterion may include the threshold signal-to-noise value. The third criterion may be determined to be satisfied in response to the signal-to-noise value being greater than threshold signal-to-noise value.

In some embodiments, the memory includes bias values (B) corresponding with the first values; the method comprising:

- in accordance with a determination that the second value ($H(\theta)$) fails to satisfy the first criterion:
  - applying bias values to at least some first values associated with a first spatial indication; wherein the first spatial indication is a pre-set spatial indication.

An advantage is that, rather than maintaining the target direction at a most recently determined spatial indication, the target direction can e.g., gradually revert to the pre-set spatial indication. Thus, rather than remaining at a most recently determined target direction, the target direction can revert to the pre-set target direction.

In some aspects, the method comprises lowpass filtering the first values.

An advantage is improved stability of the target direction. Lowpass filtering may include lowpass filtering using an Infinite Impulse Response (IIR) filter e.g., a first order IIR filter. The lowpass filtering provides lowpass filtering, e.g., smoothing to reduce fluctuations of the first values over time.

In some aspects, the method comprises:

- at a frame rate, and based on each of the one or more input signals, generating first frames including first time-frequency bins with values; wherein the beamforming is based on one or more, e.g., all, values included in the first frame.

An advantage is that beamforming can be performed in a time-frequency domain. The first frame may be generated using analogue-to-digital converters and a bank of digital filters, e.g., denoted an analysis filter bank. The digital filters can be configured to provide a desired time-frequency resolution, e.g., including 64 frequency bands, e.g., spanning a time duration of 2-4 milliseconds, e.g., at a sample rate of about 16 KHz. Alternatively, the first frame may be generated using a Fourier transformation, e.g., a Fast Fourier Transformation, FFT. The Fourier transformation, e.g., FFT, may be implemented in a combination of hardware, e.g., dedicated hardware, and software.

In some aspects, the first processed signal includes second frames including second time-frequency bins including values; and wherein the output signal includes at least one time-domain signal based on the values included in the second frames.

An advantage is that beamforming can be performed in a time-frequency domain while a time-domain signal can be provided to the output unit.

In some aspects, the method comprises:

- at a frame rate, and based on each of the one or more input signals, generating first frames including time-frequency bins with values;

wherein the setting a value of the at least one steering input value (s) is performed at the frame rate or at a rate lower than the frame rate.

An advantage is that battery power consumption can be reduced e.g., without sacrificing quality as perceived by a user. A present steering value (s) is thereby updated at most at the frame rate or, typically, in situations wherein the likelihood values have a low variability, at a rate slower rate than the frame rate since the method updates the steering input value (s) only in response to the second value ($H(\theta)$) satisfying at least a first criterion. In some respects, the frame spans a first number of time divisions and a second number of frequency divisions. Each frame may include one or more values per time-frequency bin.

In some respects, a rate lower than the frame rate is determined using a timing criterion; wherein the timing criterion is determined to be satisfied every N frames, wherein N is an integer value.

In some embodiments, the hearing aid includes a motion sensor, e.g., an accelerometer, generating a motion signal; the method comprising:

- determining a change based on the motion signal from the motion sensor, and accordingly:
  - in response to determining the change, computing the multiple first values including a first value ($\mathcal{L}(\theta)$) for each spatial indication ($\theta$) comprised by multiple spatial indications.

An advantage is that the first values can be updated, e.g., computed anew, in response to a user's head movement. In some examples, the first values are updated at a relatively slow rate, e.g., less frequently than at each frame, but is updated immediately, e.g., successively for a period of time, in response to a head movement.

The change may be associated with a head movement e.g., a head turn, e.g., an acceleration and/or deacceleration of a head movement. The change may be associated with a shifted orientation of the user's head e.g., a shifted orientation exceeding an orientation threshold value. The orientation threshold value may be e.g., a value of 10°, 30°, 45° or another value.

In some embodiments, the hearing aid includes a motion sensor, e.g., an accelerometer, generating a motion signal; and wherein the memory includes bias values (B) corresponding with the first values; the method comprising:

- determining, based on the motion signal, that a motion of the hearing aid exceeds a fourth criterion, and accordingly:
  - applying bias values to at least some of the first values to include biased values at least for values associated with a first spatial indication ($\theta^{**}$); or
  - forgo applying bias values e.g., including resetting, the first values to not include biased values at least for values associated with the pre-set spatial indication.

An advantage is that a movement such as a head movement, detected by the motion sensor, enables a motion-based control of a bias increasing the tendency to revert the target direction to e.g., a pre-set direction. The motion-based control may reset the bias or change the effect of the bias. In some examples, the bias is reset when a head-movement causes the fourth criterion to be satisfied e.g., using an assumption that it is likely that a (previous or most recently determined) target direction is no longer valid because the user has turned his/her head. The bias may be reset by forgo using the bias values or setting all bias values In some respects, the bias is shifted by an offset which is in accordance with an amount of head movement. As an example, the amount of head movement e.g., in a horizontal plane, is determined and the amount of head movement is used to shift or offset the 'localization' of the bias to bias first values at a shifted location representation associated with the amount of head movement, e.g., 30 degrees.

The method may include processing, e.g., pre-processing, the motion signal by one or more of filtering, e.g., lowpass filtering; transformation e.g., to reduce a three-dimensional motion signal to a two-dimensional or one-dimensional motion signal; and sample-rate conversion. Processing of the motion signal may include other processing steps.

In some embodiments the method comprises:

- determining a change based on one or more of: at least one of the input signals from the two or more microphones and the first processed signal, and accordingly:
  - in response to determining the change, computing the multiple first values including the first value ($\mathcal{L}(\theta)$) for each steering value comprised by the multiple steering values.

An advantage is that fast changes in the sound captured by the microphones can be adapted in response appearing, whereas battery power consumption can be reduced at times when the sound, e.g., its spatial direction is more stable.

Determining a change may include determining one or more of: a change in voice activity, change in level, e.g., power level, a change in signal-to-noise ratio, and a change in level and/or signal-to-noise ratio across frequency bands.

In some embodiments, determining the one or more salient first values ($\mathcal{L}^*(\theta)$) is performed in response to determining to change the steering value (s).

An advantage is that computational power and battery power consumption can be reduced since determining the salient first value(s) is performed, e.g., only, when needed.

In some aspects, the first criterion includes a threshold hysteresis.

An advantage is that the threshold hysteresis may reduce a tendency to change the target direction. The hysteresis may include a low threshold value and a high threshold value e.g., obtained by experimentation with setting different low and high threshold values.

A simple approach to improve stability is to add hysteresis. The hysteresis, at least implicitly, quantifies the amount of change in the second value required to 'shift back' or 'shift again' once a determination to shift the target direction is mad$_{\theta}$. Thus, the hysteresis threshold requires a greater change in the second value before 'shifting back' or 'shifting again' compared to the change in the second value causing a change in the first place. This essentially ensures that the system must have a high level of confidence that the target is coming from a particular direction before updating the target direction. The hysteresis-based stabilization may as well be combined with the other described stabilization methods.

In some aspects, the first values are scaled to sum to a seventh value; wherein the first criterion includes a first threshold value (T1); and wherein the first threshold is a fixed threshold.

An advantage is that the scaling, e.g., normalizing, enables that the first threshold can be a fixed value across recurring computations of the first values. In some examples, the first values are scaled to sum to 1.0. The threshold may be a value between 0 and 1.0.

In some aspects, the first criterion includes a first threshold value (T1); and wherein the first threshold is an adaptive threshold moving in response to one or both of the variability and a sum of the first values.

An advantage is that an alternative to scaling or normalizing the first values is provided.

In some embodiments, a fifth criterion defines a first type of sound activity; the method comprising:

- based on one or more of: at least one of the input signals and the first processed signal, determining that the fifth criterion is satisfied; and
- in response to determining that the first criterion and the fifth criterion are satisfied:
  - setting the first steering value ($s^*$) based on the steering value (s) associated with the at least one salient first value ($\mathcal{L}^*(\theta)$).

An advantage is that presence of the first sound activity can be used as a criterion for shifting the location of the beamforming beam. In some examples the first type of sound activity is speech activity. Speech activity may be detected using a so-called voice-activity detector, VAD. In some examples the first type of sound activity is another type of sound, different from speech or including speech. A voice-activity detector may be based on changes in signal levels and/or changes in rates of changes of signal levels e.g., based on timing criteria. A voice-activity detector may be based on a trained neural network e.g., a convolutional neural network. Training of a neural network to obtain a voice-activity detector is known in the art.

In some respects, the third criterion defines multiple classes of sound activity e.g., including a first class including speech activity and a second class including alert sounds e.g., including sirens, bells and horns.

Another way to stabilize the decision is to only update the likelihood values when speech activity is detected. A voice activity detector (VAD) may be used to control whether the likelihood values should be calculated and/or used to update the target position. The VAD may be based on a single microphone or multiple microphones, it may provide a single estimate across all frequency bands or a VAD estimate for each separate frequency band. The VAD may be based on a beamformed signal (hereby speech from e.g., the front direction becomes easier to detect compared to speech from the back). The VAD may rely on speech modulation cues. The VAD decision may as well be based on a pre-trained neural network.

In some aspects, a fifth criterion defines a first type of sound activity; the method comprising:

- based on one or more of: at least one of the input signals and the first processed signal, determining that the fifth criterion fails to be satisfied;
- in accordance with a determination that the fifth criterion fails to be satisfied:
  - forgoing computing the first value ($\mathcal{L}(\theta)$) for each of the multiple spatial indications.

An advantage is that the computational effort of computing the likelihood values can be saved at least at times when the third criterion is not satisfied e.g., when voice-activity is not detected. An advantage is that computational power and battery power can be saved in situations with the first type of sound activity is absent or at least not detected.

In some embodiments, the memory stores a data structure including, for each steering value, one or more values for an estimated transfer function; wherein, for each steering value, the first value ($\mathcal{L}(\theta)$) is computed based on input signals from the two or more microphones and the values for an estimated transfer function.

An advantage is that the data structure enables convenient storage and navigation between items and/or lookup of items. The data structure may include a first collection of items. Examples of data structures include tables; lists, such as linked lists, and dictionaries.

In some respects, the representation of an estimated transfer function ($d(\theta)$) and the spatial indication ($\theta$) are stored during a software install or software update in a read-only portion of the memory. The first value is stored in a read-write manner.

The data structure may include bias values (cf. the bias values mentioned above).

In some aspects, the steering value (s) is equal to the at least one value of the representation of the estimated transfer function ($d(\theta)$) associated with the spatial indication ($\theta^*$) associated with the at least one salient first value ($\mathcal{L}^*(\theta)$); or the steering value (s) is based on a closed-form expression including the at least one value of the estimated transfer function ($d(\theta)$) associated with the spatial indication ($\theta^*$) associated with the at least one salient first value ($\mathcal{L}^*(\theta)$).

An advantage is that the at least one value of the representation of the estimated transfer function can be used both for estimating the likelihood of a target sound arriving from a specific location and for setting the beamforming beam to that location if it is determined to change the location of the beamforming beam. Computational power required for changing the location of the beam to a different location may be reduced.

At least one steering value may be based on a closed-form expression including the at least one value of the estimated transfer function e.g., including multiplication, division, summation, subtraction, e.g., including changing the sign of one or more values.

In some aspects, the method comprises:

- estimating beamformer weight values ($w_\theta$) for a Minimum Variance Distortion-less (MVDR) beamformer for a spatial indication ($\theta$) associated with one or more salient first values.

An advantage is that minimum distortion and maximum signal-to-noise ratio is achieved from a target sound source.

In some aspects, beamforming is based on beamformer weight values ($w_\theta$); wherein the method comprises:

- determining the beamformer weight values ($w_\theta$) based on the input signals (x) from the two or more microphones and the at least one steering input value (s; $d^*_\theta$), including obtaining a covariance matrix ($C_V$) for a spatial indication ($\theta^*$) associated with the salient first value ($\mathcal{L}^*(\theta)$).

An advantage is that optimal beamformer weight values that enhances the signal to noise ratio, SNR, for a given target position in a noise field represented the covariance matrix can be obtained.

In an example, for a given target position $\theta$ in a noise field described by the noise covariance matrix $C_v$, optimal beamformer weight values are given by:

$$w_\theta = \frac{R_v^{-1} d_\theta}{d_\theta^H C_v^{-1} d_\theta},$$

where $d_\theta$ is the relative transfer function between the microphones for a target position $\theta$. The normalization factor in the denominator ensures that the weight scales the output signal such that the target signal is unaltered compared to the target signal at the reference microphone. The target position $\theta$ is depending on the direction of the target as well as the distance from the target to the microphone array. In the frequency domain, $d_\theta$ is an M×1 vector, which due to the normalization with the reference microphone will contain M−1 complex values in addition to the value 1 at the reference microphone position.

In some aspects, the first processed signal is further based on the beamformer weight values ($w_\theta$).

In some aspects, a fifth criterion defines a first type of sound activity, comprising:

- detecting sound activity in time segments and/or frequency bands based at least on the fifth criterion;

wherein the covariance matrix ($C_V$) is a noise covariance matrix, which is estimated based on the input signals (x) from the two or more microphones in time segments and/or frequency bands for which the fifth criterion fails to be satisfied.

An advantage is that optimal beamformer weight values that enhances the signal to noise ratio, SNR, for a given spatial indication $\theta$ can be obtained. The noise field is represented by the (noise) covariance matrix, $R_V$.

In some embodiments, a fifth criterion defines a first type of sound activity, comprising:

detecting sound activity associated with the first type of sounds based on at least the fifth criterion;

estimating first covariance values (Cx) based on detecting the first type of sounds and estimating second covariance values (Cv) based on failure to detect the first type of sounds;

based on the value of the steering input value, estimating beamformer weight values ($w_\theta$);

wherein the first value ($\mathcal{L}(\theta)$) is computed for each spatial indication (θ) based on: the first covariance value, the second covariance value, and the representation of the estimated transfer function (d(θ)).

An advantage is the effective provision of likelihood values representing the likelihood of a target direction. The first type of sound activity may be voice activity.

In some embodiments, the first covariance values (Cx) and the second covariance values (Cv) are obtained via a smoothing process, e.g., an adaptive smoothing process.

An advantage is the provision of more stable likelihood values. The more stable likelihood values typically represent the direction to sounds sources in a more useful way.

In some embodiments, the hearing aid is a first hearing aid, wherein the method comprises:

receiving eight values ($\mathcal{L}(\theta)$) from a second hearing aid, used in conjunction with the first hearing aid; wherein the eight values are likelihood values from the second hearing aid;

wherein the spatial indication associated with a salient first value ($\mathcal{L}^*(\theta)$) is obtained by including the eight values in determining the salient first value; and transmitting the spatial indication associated with a salient first value and obtained by including the eight values in determining the salient first value to the second hearing aid.

An advantage is that at least one common spatial indication associated with one or more salient, e.g., maximum, first values and one or more salient, e.g., maximum, eight values is determined and that it is enabled that the at least one common spatial indication becomes common for both hearing aids.

Typically, the hearing instrument user wears two hearing instruments. It is desirable that the target position is aligned between the two hearing instruments.

Thus, the target update decision shall be updated simultaneously based on a joint decision between the two instruments. The decision may be based on likelihood estimates from both instruments. Often one instrument will have a more confident target estimate compared to the other instrument, and the target position from the instrument with the highest confidence may be applied to both instruments.

There is also provided a computer-readable storage medium comprising one or more programs for execution by one or more processors; wherein the one or more programs includes instructions for performing the method according to any of the preceding claims.

A computer-readable storage medium may be, for example, a software package, embedded software. The computer-readable storage medium may be stored locally and/or remotely.

There is also provided a hearing aid comprising:

one or more processors; one or more microphones; and an output unit;

wherein the processor is configured to perform the method according to any of the preceding claims.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g., acoustically, electrically, or optically) with each other. The loudspeaker may be arranged in a housing together with other components of the hearing aid or may be an external unit (possibly in combination with a flexible guiding element, e.g., a dome-like element).

In some aspects, the hearing aid comprises a motion sensor, e.g., an accelerometer.

An advantage is that the likelihood values obtained from processing of the values representing sound, i.e., one or more of the first values, the second values and the third values, can be biased using values associated with motion. The motion is associated with motion of the microphones and with motion of the user's head when the hearing aid is in a normal position during use.

There is also provided a binaural hearing aid system, comprising a first hearing aid as set out above.

There is also provided:

A hearing aid including one or more processors, a memory, two or more microphones, and an output transducer; configured to:

generate a first processed signal (y) using beamforming based on input signals from the two or more microphones and a steering value; wherein a target direction is associated with the steering value;

supply a signal (o) to the output transducer based on the first processed signal (y);

for each steering value (s; d), comprised by multiple steering values, compute a first value ($\mathcal{L}(\theta)$); wherein the first value ($\mathcal{L}(\theta)$) is associated with a likelihood of an acoustic sound signal arriving from the target direction associated with the steering value;

determine at least one salient first value ($\mathcal{L}^*(\theta)$) among the multiple first values and determining a steering value (s*) associated with the at least one salient first value ($\mathcal{L}^*(\theta)$); and compute a second value (H(θ)) associated with variability of at least some of the multiple first values;

determine to change the first steering value (s*) in response to a determination that the second value (H(θ)) satisfies at least a first criterion; and accordingly:

generate the first processed signal (y) using beamforming based on the steering value (s*) associated with the at least one salient first value ($\mathcal{L}^*(\theta)$).

BRIEF DESCRIPTION OF THE FIGURES

A more detailed description follows below with reference to the drawing, in which.

DETAILED DESCRIPTION

Figure 1:
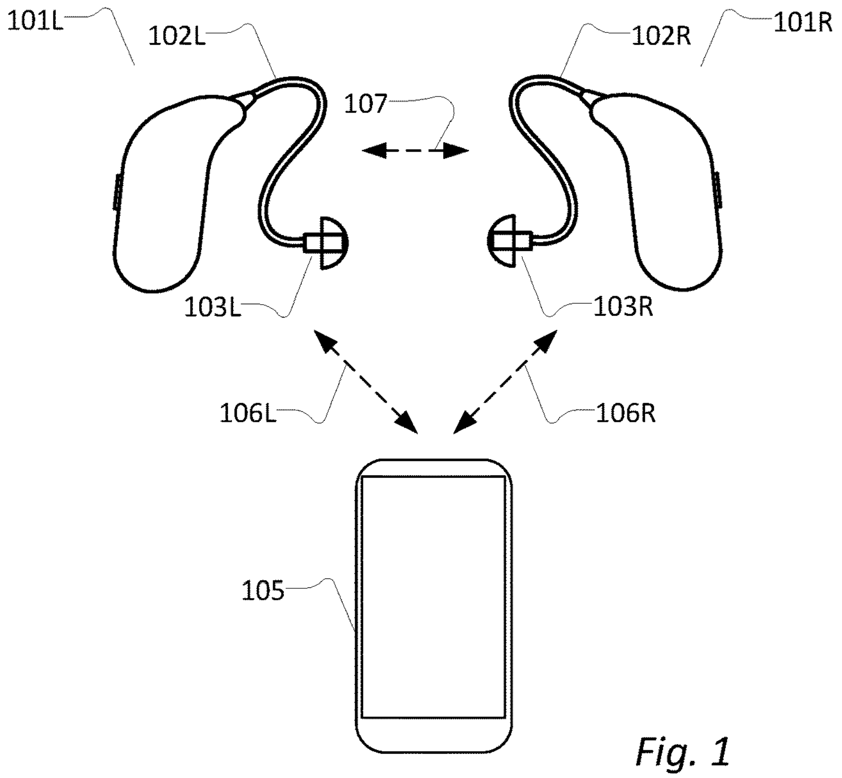
FIG. 1 shows a pair of hearing aids in a hearing aid system.

A method for determining a Direction-of-Arrival, DOA, using a maximum likelihood estimate in connection with beamforming based on microphone signals is disclosed in EP3413589-A1 assigned on its face to Oticon A/S. The method, the DOA-method, is based on having stored, in the hearing aid, a dictionary of relative transfer functions (RTFs); wherein each relative transfer function (RTF) is stored in a dictionary element and is associated with a target direction. In particular, the dictionary contains values RTFs. The RTFs represent acoustic transfer from a target signal source to any microphone in the hearing aid system relative to a reference microphone. Each RTF is thus associated with a target direction, a target location or a target zone depending on implementation of the beamformer. The target direction, target location or target zone may be explicitly represented in the dictionary or implicitly represented e.g., by being associated with a position or index in the dictionary. Herein, the term target direction will mainly be used although it is understood that location or zone may apply instead.

In particular, it is possible to estimate the likelihood, for each RFT, that the RTF represents the sound transfer from the target direction associated with the RTF to the microphones. A likelihood value can be computed based on so-called noise covariance matrixes, target covariance matrixes and beamformer weights. It can be said that the DOA-method is based on estimating values of a noise ('noise only') covariance matrix and a noisy ('target sound including noise') covariance matrix. The noise covariance matrixes and target covariance matrixes are in turn computed based on the microphone signals.

Based on computing a likelihood value for each RTF, the DOA-method scans the dictionary elements to identify the RTF most likely, i.e., with the highest likelihood value, representing sound transfer from the target sound source to the microphones. From the identified RTF, a steering value for the beamformer can determined and the beamformer can be steered to the target direction. The likelihood value may be stored in the dictionary or in another data structure. The steering value may be equal to the values of the identified RTF or the steering value(s) may be determined based on the RTF. The steering value may be stored in the dictionary or in another data structure. Herein, the RTF is designated as $d_\theta$, for a target direction θ. The steering value is designated as s. In some examples $s=d_\theta$. The steering value may be determined from the transfer function, e.g., based on a closed-form expression.

Turning to beamforming, for a frequency band, given a microphone input signal x, from two or more microphones, M, it is possible to generate a beamformed output signal y from a linear combination of the input signal by multiplying each microphone signal by (complex-valued) beamformer weight values, $w_\theta$, i.e., $y=w^H x$, wherein H denotes the Hermitian transposition, and wherein subscript θ designates a target direction (or location, or zone). The beamformer weight values provides for optimizing e.g., the signal-to-noise ratio for the beamformer. The beam cannot always be steered to a target location; however, it is possible to ensure that the beamformed signal from the target is undistorted at least from a theoretical perspective In some respects, optimal beamformer weight values that enhance the signal-to-noise ratio for a given target direction θ in a noise field described by the noise covariance matrix $R_v$ may be given by:

$$w_\theta = \frac{R_v^{-1} d_\theta}{d_\theta^H R_v^{-1} d_\theta},$$

where $d_\theta$ is the relative transfer function between the microphones for a target direction θ. For M microphones $d_m$, $m \in \{1, \ldots M\}$, each associated with values of $d_\theta$, $d_m(\theta) = h_m(\theta)/h_{ref}(\theta)$, wherein $h_m(\theta)$ is the transfer function from a target direction to the m'th microphone and wherein $h_{ref}(\theta)$ is the transfer function from the target direction to one of the microphones designated as a reference microphone. In a hearing aid it may be the front-most microphone, which is designated as the reference microphone.

The normalization factor in the denominator ensures that the weight scales the output signal such that the target signal is unaltered compared to the target signal at the reference microphone, i.e., $w_\theta^H=1$. It is thus an object to determine, in a way that is suitable for implementation in hearing aids, covariance matrix values and determine a steering input for the beamforming e.g., based on the relative transfer function values.

The value of the target direction θ depends on the direction of the target and the distance from the target to the microphone array. In the frequency domain, $d_\theta$ is an M×1 vector, which due to the normalization with the reference microphone will contain M−1 complex values in addition to the value 1 at the reference microphone position. There are M microphones.

For K frequency bands, there it is needed to store K×(M−1) complex values, for each target position from which we need to optimize the signal-to-noise ratio. Each set of K values is denoted $D_\theta=[d_\theta^1 \ldots d_\theta^k \ldots d_\theta^K]$, where k is the frequency index. In the time domain the relative transfer across frequency can be described by an impulse response. In the real world there is an infinite amount of possible target positions, but in the hearing instrument there is a finite number of target positions due to limited memory as well as due to limited computational power. If the steering vector and the target direction fully agree, it is possible to optimize performance from the beamformer output, both in terms of signal-to-noise ratio and in terms of target distortion. The further away the steering vector is from the target direction, the smaller the obtainable signal-to-noise ratio improvement and the higher the distortion of the target sound source. The signal-to-noise ratio (improvement) may even get negative since the target sound source is at risk of getting suppressed. It is thus critical to select a beam that coincides with target sound source and have such target beams available, e.g., by selection, for the beamforming.

Often the target position is assumed to be in front of the listener, as this target position is a common direction of interest. However, we may have more than one direction of interest stored in memory. We may e.g., have a dictionary of Q relative transfer functions:

$$D = \{D_{\theta_1}, \ldots , D_{\theta_q}, \ldots , D_{\theta_Q}\},$$

It may be assumed that the dictionary of steering vectors covers most of the relevant target directions. The better the true target position agrees with the selected candidate in our dictionary the higher signal-to-noise improvement we obtain. This is described in more detail in EP3413589-A1 e.g., in connection with FIGS. 2A-2G, which show graphical representations of relative transfer functions and in connection with paragraphs [0157]-[0158]. Also, estimation and selection of the steering vector based on a likelihood function is described in e.g., EP3413589-A1.

Selecting, e.g., changing, steering vector too frequently, causes however artefacts e.g., due to an undesired modulation of the noise surrounding the user. One way to reduce audible artefacts caused by switching from one steering value to another includes stabilizing the decision whether to change to another steering value over time. This may include limiting the frequency of changing the steering vector. To avoid too many switching decisions, the steering vector values are changed only when we are confident that the direction has changed.

The output of the likelihood function is a set of probabilities related to each element θ and typically, we find the most likely position, as the position that maximized the log likelihood function is given by:

$$d_{\theta^*} = \underset{d_\theta \in \Theta}{\operatorname{argmax}} \mathcal{L}(\theta),$$

where $\mathcal{L}(\theta)=\log p(\theta)$, and $p(\theta)$ is the probability for a given target position θ. Typically, $\Sigma_{q=1}^{Q} p(\theta_q)=1$. The likelihood function may depend on target and noise covariance estimates.

If the probabilities related to the maximum $p(\theta_*)$ is much more likely than the other probabilities, there is a higher confidence in the decision compared to if all probabilities are more alike $$\left(\text{i.e. } p(\theta_*) \approx \frac{1}{Q}\right).$$

One way to assess this is to consider the entropy of the likelihood function.

The entropy of the likelihood function is given by $$H(\Theta) = -\sum_{q=1}^{Q} p(\theta_q)\log p(\theta_q).$$

It is noted that the entropy is minimized if all probabilities, but one is 0, and $p(\theta_*)=1$. And the entropy is maximized if $$p(\theta_q) = \frac{1}{Q}.$$

In one embodiment it is possible to choose to update the target direction, only if the entropy is smaller than a predefined threshold.

$\mathcal{L}(\theta)$ may be computed as described in EP3413589-A1 e.g., based on paragraphs [0106] through [0125] and other passages therein. It is added that, in paragraph [0119], in equation 17, the nominator and denominator in the first term, may be interchanged.

Alternatively, the likelihood values may be estimated as set out below:

$$\mathcal{L}(\theta) = -(M-1)\mathrm{Log}(\lambda_{V,\theta}) + \mathrm{Log}\left(\frac{\omega_\theta^H C_X(l)\omega_\theta}{\omega_\theta^H C_V(l_0)\omega_\theta}\right) - \mathrm{Log}(|C_V(l_0)|)$$

Wherein M is the number of microphones; $\lambda_{V,\theta}$ is defined in EP3413589-A1; $\omega_\theta$ are the beamformer weights for the target direction θ, $\lambda_{V,\theta}$ is the time-varying power spectral density of the noise process measured at the reference microphone, $C_X$ is a target covariance matrix and $C_V$ is a noise covariance matrix; l designates the frame index, and $l_0$ denotes the most resent frame where speech is absent and superscript H designates the Hermetian matrix transposition.

For two microphone inputs, the likelihood values may be estimated as set out below:

$$\mathcal{L}(\theta) = +/- \mathrm{Log}\left(\frac{\omega_\theta^H(l) C_X(l)\omega_\theta(l)}{\omega_\theta^H(l) C_V(l_0)\omega_\theta(l)}\right)$$

Alternatively, for two microphone inputs, the likelihood values may be estimated as set out below:

$$\mathcal{L}(\theta) = \mathrm{Log}\left(\frac{b_\theta^H C_X(l) b_\theta}{b_\theta^H C_V(l_0) b_\theta}\right)$$

Wherein b is the so-called blocking matrix which is signal-independent and therefore may be pre-computed and stored in the memory.

DESCRIPTION OF THE FIGURES

FIG. 1 shows an illustration of hearing aids and an electronic device. The electronic device 105 may be a smartphone or another electronic device capable of short-range wireless communication with the hearing aids 101L and 101R via wireless links 106L and 106R. The electronic device 105 may alternatively be a tablet computer, a laptop computer, a remote wireless microphone, a TV-box interfacing the hearing aids with a television or another electronic device.

The hearing aids 101L and 101R are configured to be worn behind the user's ears and comprises a behind-the-ear part and an in-the-ear part 103L and 103R. The behind-the-ear parts are connected to the in-the-ear parts via connecting members 102L and 102R. However, the hearing aids may be configured in other ways e.g., as completely-in-the-ear hearing aids. In some examples, the electronic device is in communication with only one hearing aid e.g., in situations wherein the user has a hearing loss requiring a hearing aid at only one ear rather than at both ears. In some examples, the hearing aids 101L and 101R are in communication via another short-range wireless link 107, e.g., an inductive wireless link.

The short-range wireless communication may be in accordance with Bluetooth communication e.g., Bluetooth low energy communication or another type of short-range wireless communication. Bluetooth is a family of wireless communication technologies typically used for short-range communication. The Bluetooth family encompasses ‘Classic Bluetooth’ as well as ‘Bluetooth Low Energy’ (sometimes referred to as “BLE”).

Figure 2:
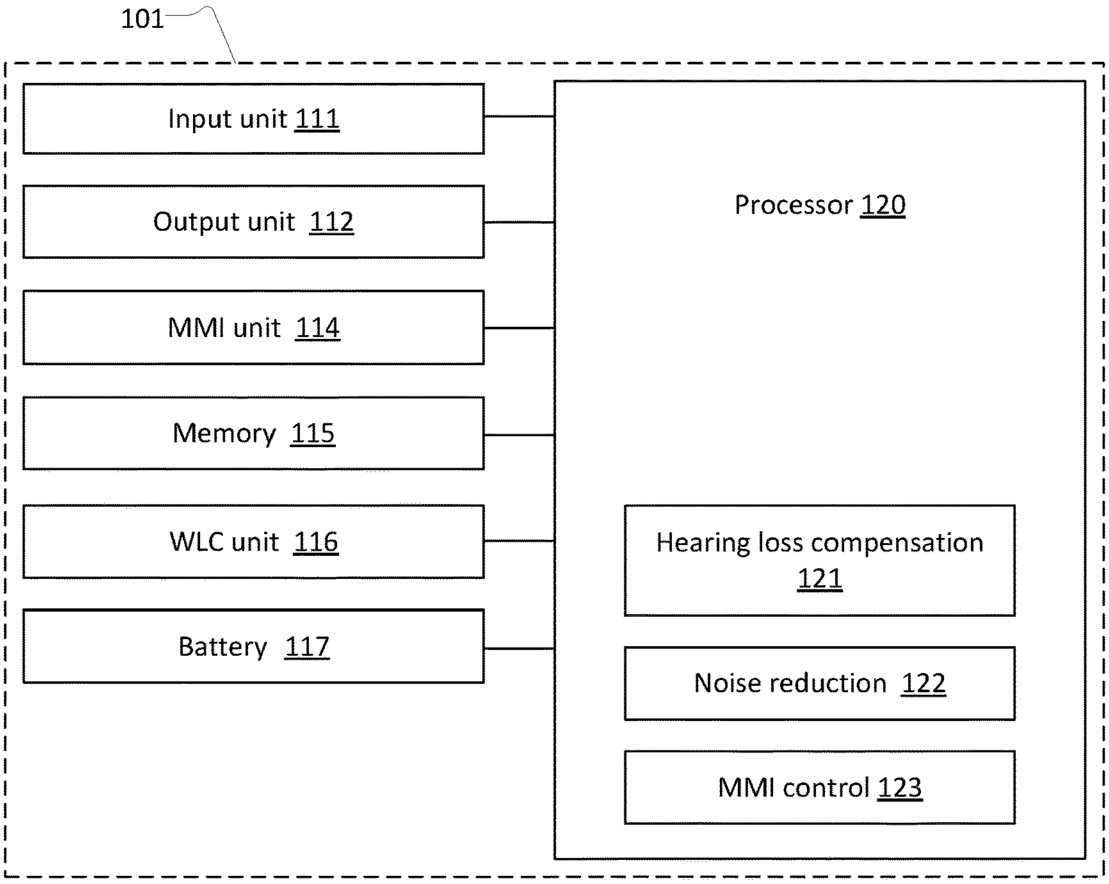
FIG. 2 shows a block diagram of a hearing aid.

FIG. 2 shows a first block diagram of a hearing aid. The hearing aid 101 comprises an input unit 111, an output unit 112, a man-machine interface unit MMI, 114, a memory 115, a wireless communication unit (WLC unit) 116, a battery 117 and a processor 120. The battery may be a single-use battery or a rechargeable battery. The processor 120 may comprise a unit 121 configured to perform hearing loss compensation, a unit 122 configured to perform noise reduction, and a unit (MMI control) 123 for controlling man-machine interfacing.

The input unit 111 is configured to generate an input signal representing sound. The input unit may comprise an input transducer, e.g., one or more microphones, for converting an input sound to the input signal. The input unit 111 may include e.g., two or three external microphones configured to capture an ambient sound signal and an in-ear microphone capturing a sound signal in a space between the tympanic member (the eardrum) and a portion of the hearing aid. Additionally, the input unit may comprise a wireless receiver for receiving a wireless signal comprising or representing sound and for providing the signal representing sound.

The output unit 112 may comprise an output transducer. The output transducer may comprise a loudspeaker (sometimes denoted a receiver) for providing an acoustic signal to the user of the hearing aid. The output unit may, additionally or alternatively, comprise a transmitter for transmitting sound picked up by the hearing aid to another device.

One or both of the input unit 111 and the noise reduction unit 122 may be configured as a directional system. The directional system is adapted to spatially filter sounds from the surroundings of the user wearing the hearing aid, and thereby enhancing sounds from an acoustic target source (e.g., a speaking person) among a multitude of acoustic sources in the surroundings of the user. The directional system may be adapted to detect, e.g., adaptively detect, from which direction a particular part of the microphone signal originates. This can be achieved in different ways as described e.g., in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The man-machine interface unit 114 may comprise one or more hardware elements, e.g., one or more buttons, one or more accelerometers and one or more microphones, to detect user interaction.

The wireless communication unit 116 may include a short-range wireless radio e.g., including a controller in communication with the processor.

The processor may be configured with a signal processing path receiving audio data via the input unit with one or more microphones and/or via a radio unit; processing the audio data to compensate for a hearing loss; and rendering processed audio data via an output unit e.g., comprising a loudspeaker. The signal processing path may comprise one or more control paths and one or more feedback paths. The signal processing path may comprise a multitude of signal processing stages.

Figure 3:
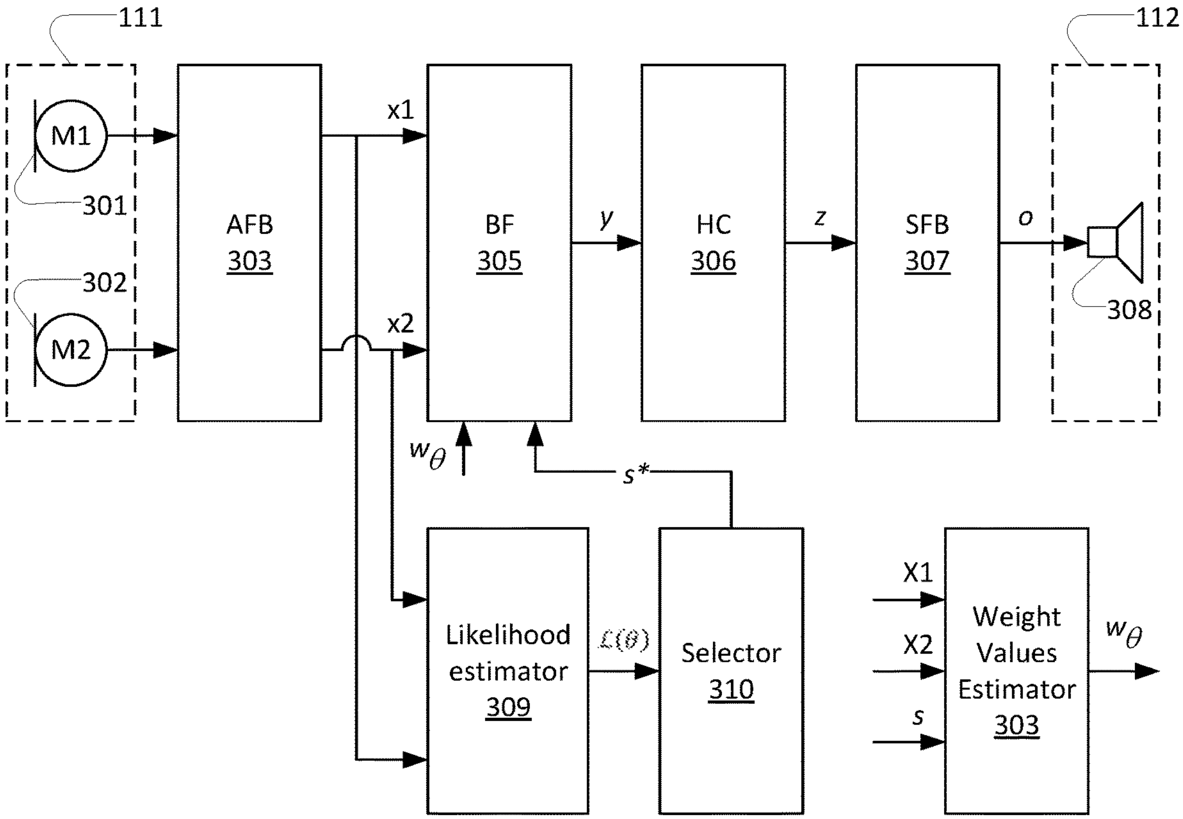
FIG. 3 shows a block diagram of a hearing aid processor including a beamformer, a likelihood estimator, and a variability estimator.

FIG. 3 shows a block diagram of a hearing aid processor including a beamformer, a likelihood estimator, and a variability estimator. The input unit 111 and the output unit 112 are shown in conjunction with the hearing aid processor. The input unit 111 includes at least a first microphone 301 and a second microphone 302 providing respective input signals, e.g., analogue, or digital time-domain signals, to analysis filter banks, AFB, 303 and 304. The analysis filter banks 303 and 304 output time-frequency signals x1; x2, e.g., in consecutive time-frequency frames containing signal values. Each time-frequency frame may correspond to a duration of about 1 millisecond or longer or shorter. The time-frequency signals are input to a beamformer, BF, 305.

The beamformer outputs a beamformed signal, y, based on the time-frequency signals x1, x2, beamformer weight values, $w_\theta$, and a steering value, s*. The beamformer modifies the phase and/or amplitude of one or more of its input signals to provide at its output the beamformed signal wherein an acoustic signal from a target direction, θ, is enhanced by constructive interference over acoustic signals from at least some directions other than the target direction.

The steering value, s*, controls the target direction by modifying the phase of the signals input to the beamformer. The steering value, s*, is the steering value applied to the beamformer. The steering value may be selected from among a set of precomputed steering values, e.g., each being equal to one or more transfer function value or relative transfer function values. The weight values, $w_\theta$, controls the gain applied to the input signals and are optimized with respect to e.g., minimizing distortion and/or signal-to-noise ratio of the signal from the target direction, θ.

The beamformed signal, y, is processed by a hearing compensation processor HC, 306. The hearing compensation processor HC, 306 may be configured to provide compensation for a hearing loss, e.g., a prescribed hearing loss, and may include a compressor and frequency specific gain compensation as it is known in the art of hearing aids. The hearing compensation processor 306 may be configured to control volume e.g., in response to a signal received from a user via the man-machine interface unit 114. Further, the hearing compensation processor 306 may be configured to prevent and/or suppress undesired feedback artefacts such as howling. One or both of the beamformer 305 and the hearing compensation processor 306 may be further configured to perform noise reduction including e.g. transient noise reduction and/or wind noise reduction.

The hearing compensation processor 306 provides a processed signal, z, to a synthesis filter bank, SFB, 307. Between the analysis filter bank 303 and the synthesis filter bank 307 signal processing may be performed in the time-frequency domain e.g., frame-by-frame, within frames, and/or across frames. Thus, signal processing takes place in different frequency bands. The synthesis filter bank 307 generates a time-domain output signal, o, based on the time-frequency signal, z. The output unit 112 is configured to receive the output signal, o, and accordingly generate an acoustic signal e.g., using a miniature loudspeaker 308 arranged at or in the ear-canal of the user wearing the hearing aid.

Rather than using one fixed target direction, it is possible to compute a likelihood value for each of multiple target directions. As mentioned above, the likelihood values may be computed based on the disclosure in e.g., EP3413589-A1 e.g., based on paragraphs [0106] through [0125] and other passages therein and additionally/alternatively as described herein. The likelihood estimator 309 is configured to estimate the likelihood values, $\mathcal{L}(\theta)$, for each of multiple target directions/locations/zones, $\theta_{1 \ldots Q}$. The likelihood estimator 309 outputs multiple likelihood values, wherein each likelihood value is associated with a target direction. The likelihood values may be stored as elements in the dictionary as mentioned above or as items in a list or in another way. The number of likelihood values may correspond with the number of target directions. The target directions, e.g., represented in degrees e.g., in polar coordinates, or as indexes or in another way, need not be explicitly stored.

A first, prior art method identifies a greatest likelihood value, obtains a steering value corresponding with the greatest likelihood value, and changes the target direction to correspond with the greatest likelihood value.

A second method, presented herein, performs evaluation of the likelihood values before determining to change a steering value, s. A selector 310 is configured to determine a steering value, s, based on a selector method. The selector method includes:

- computing an entropy value, $H(\theta)$, or another value reflecting a variability, e.g., variance, of the likelihood values;
- determining to change the steering value (s) input to the beamformer in response to a determination that the entropy value ($H(\theta)$) satisfies at least a first criterion, e.g., including a threshold; and accordingly:
  - setting the first steering value (s).

The first steering value (s) is determined based on determining the greatest likelihood value $\mathcal{L}^*(\theta)$, e.g., a maximum value, and determining the steering value (s) associated with the greatest value $\mathcal{L}^*(\theta)$. The greatest value $\mathcal{L}^*(\theta)$ serves also to identify an estimated direction of arrival, DoA.

The selector method also includes forgoing changing the steering value (s) input to the beamformer in response to a determination that the second value ($H(\theta)$) satisfies at least a first criterion. Thus, if the entropy value fails to satisfy the first criterion, the steering value is not updated. Rather, the beamformer keeps performing beamforming in accordance with a previously set steering value.

Examples of how the selector method works are disclosed below, in connection with FIG. 6*a*-6*d*.

As alternatives to computing the entropy value, the selector method may be based on alternative values representing variability of the likelihood values. In some examples, the selector method may compute a variance of the likelihood values. The variance may include a sum of squared differences, wherein the differences are differences between the likelihood values and a mean value of the likelihood values. In some examples, the selector method may compute a difference between a greatest value among the likelihood values and an average or median value of the likelihood values. In some examples, the selector method may compute a difference between a third value and a fourth value; wherein the third value is based on one or more greatest values of the likelihood values; and wherein the fourth value is based on one or more values different from the one or more greatest values.

The selector method enables keeping a more stable target direction, while being able to respond to significant changes in an estimated direction of arrival, DOA, θ.

As mentioned above, the beamformer outputs the beamformed signal, y, based also on the beamformer weight values, $w_\theta$, in addition to the steering value, s. The beamformer weight values are computed by a weight values estimator 303 e.g., as it is described in the prior art based on the input signals and the steering value, s.

Figure 4:
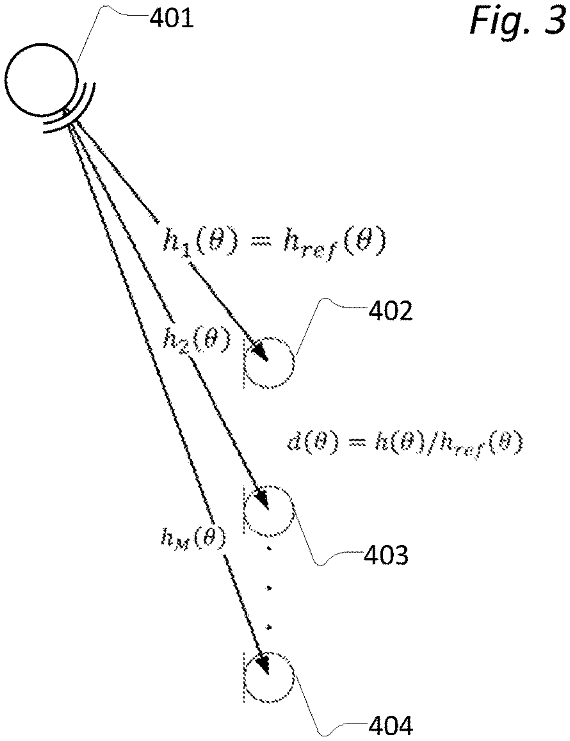
FIG. 4 shows a configuration of a set of microphones relative to a target sound source.

FIG. 4 shows a configuration of a set of microphones relative to a target sound source. The target sound source 401, e.g., a speaking person, is located at a target direction, θ, with respect to the set of microphones including microphones 402, 403 and 404. A transfer function $h_1(\theta)$ describes the propagation of sound from the target sound source 401 to the microphone 402. Correspondingly, transfer functions $h_2(\theta)$, $h_3(\theta)$ describe the propagation of sound from the target sound source 401 to the microphones 403, 404.

Each of the transfer functions, but a reference transfer function can be expressed as a combination of a relative transfer function and the reference transfer function. The relative transfer functions may be used for obtaining a steering value aiming the target direction at the position of the target sound source.

An ordered collection, e.g., a dictionary, stores relative transfer functions or steering values, wherein elements in the dictionary each correspond with a target direction. The likelihood values are computed for each element in the dictionary; wherein each element correspond with a target direction and contains at least a value of a relative transfer function or a steering value).

Figure 5:
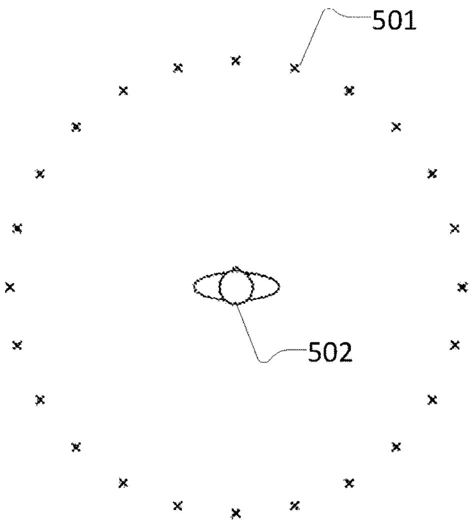
FIG. 5 illustrates a hearing aid user positioned relative to multiple target sound positions each having an estimated transfer function stored in an ordered collection.

FIG. 5 illustrates a hearing aid user positioned relative to multiple target sound positions each having an estimated transfer function stored in an ordered collection. The hearing aid user is designated 502. The target sound positions 501 each correspond with a target direction, θ, and are shown to be evenly distributed about the hearing aid user. However, the target directions need not be evenly distributed. In some examples, target directions are more densely arranged in some directions e.g., in a front direction and some side directions.

FIGS. 6*a*, 6*b*, 6*c*, and 6*d* depict likelihood values. The likelihood values are shown as vertical lines with a dot representing a likelihood value in a Cartesian coordinate system, wherein candidate target directions, enumerated by letters 'a' through 'I' are shown along the abscissa (x-axis) and the magnitude of the likelihood values are shown along the ordinate (y-axis). The variability of the likelihood values is depicted on the left-hand side of the ordinate. A present target direction, corresponding to a present steering value, is marked by a diamond.

Figure 6A:
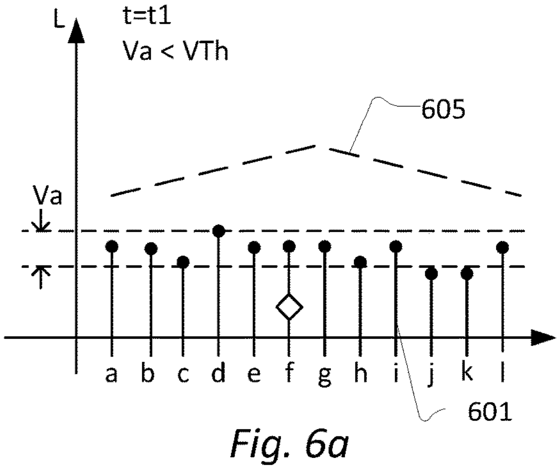
FIGS. 6*a*, 6*b*, 6*c*, and 6*d* depict likelihood values, a variability value and a threshold value.

In FIG. 6*a* the likelihood values, generally designated 601, are obtained at a first time, t=t1, and exhibits a variability, Va. The variability, Va, may be determined to not satisfy a variability criterion, e.g., by not exceeding a variability threshold, VTh. In this example, the selector method may thus decide to forgo updating the steering value of the beamformer despite a greatest likelihood value may be identified e.g., at candidate direction 'd'. The present target direction is shown to be direction 'f'.

Figure 6B:
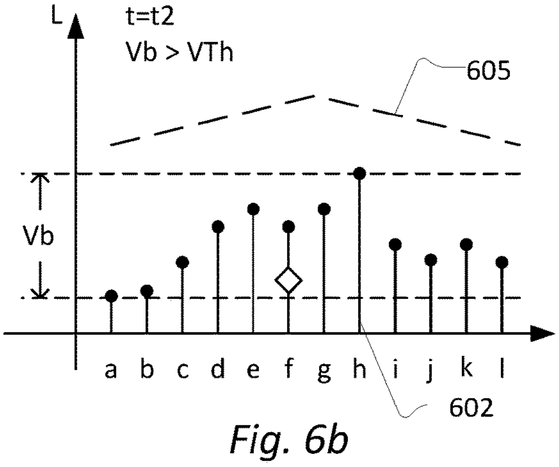

However, in some examples, e.g., wherein the variability of the likelihood values is determined to meet the variability criterion, the selector method may decide to update the steering value of the beamformer:

In FIG. 6*b* the likelihood values, generally designated 602, are obtained at a second time, t=t2, and exhibits a variability, Vb. The variability, Vb, may be determined to satisfy the variability criterion, e.g., by exceeding the variability threshold, VTh. A candidate target direction is direction 'h', whereas the present target direction is 'f'.

Figure 6C:
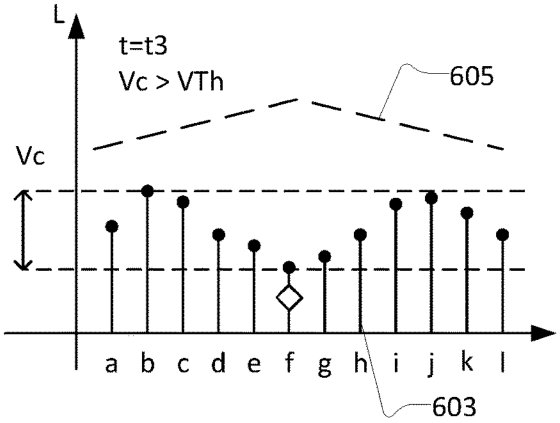

In FIG. 6*c* the likelihood values, generally designated 603, are obtained at a second time, t-t3, and exhibits a variability, Vc. The variability, Vc, may be determined to satisfy the variability criterion, e.g., by exceeding the variability threshold, VTh. This may suggest updating the target direction from a present target direction 'f' to another direction.

Figure 6D:
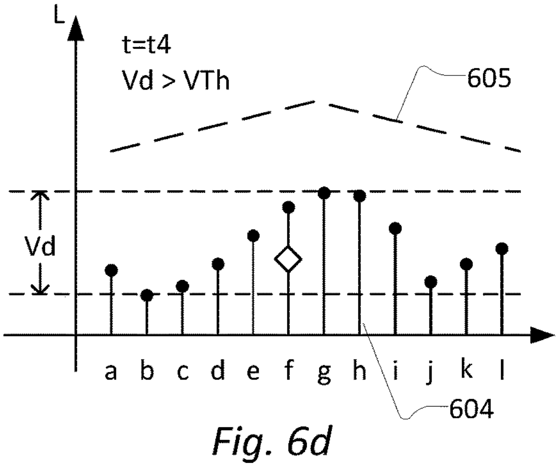

In FIG. 6*d* the likelihood values, generally designated 604, are obtained at a second time, t=t4, and exhibits a variability, Vd. The variability, Vd, may be determined to satisfy the variability criterion, e.g., by exceeding the variability threshold, VTh. This may suggest updating the target direction from the present target direction 'f' to another direction e.g., to direction 'f' which exhibits a greatest likelihood value.

In some respects, a bias method may be performed. For example, in FIG. 6*a*, wherein the variability criterion is not satisfied, the bias method may be invoked to increase the chance that a candidate target direction in a pre-set range of directions is elected over a candidate target direction in a range away from the pre-set range of directions. This is explained in more detail herein.

In FIG. 6*a* a profile of bias values 605 is shown. The bias method uses the bias values to increase the chance of electing a target direction at or about the apex or top of the profile of bias values rather than electing a target direction away from the apex or top of the profile. The apex or top of the profile of bias values may located to correspond e.g., with a direction in front of the user of the hearing aid. Thus, in FIG. 6*a* the direction in front of the user is at the middle of the profile of bias values e.g., at direction 'f' or 'g'. The magnitude of the bias values may be set in a range or scaled in accordance with the likelihood values, such that the bias values add a bias to the likelihood values rather than completely overriding the likelihood values. When the variability criterion is not met, and the likelihood values have about the same value, the bias values may have a great influence on selecting a target direction.

In FIG. 6*b*, the variability criterion is satisfied, and a greatest likelihood value can be determined. The bias method is not necessarily invoked; however, it may be invoked, nonetheless. For instance, the bias method may be invoked unconditionally or in response to determining that the variability criterion is not satisfied.

In FIG. 6*c*, the variability criterion is satisfied, however a greatest likelihood value may be only weakly or ambiguously determined. For instance, as shown, the likelihood values may exhibit approximately equal, greatest values at different directions e.g., about direction 'b' and about direction 'j' which are approximately symmetrical with respect to the bias values. In such a situation, the bias method may not disambiguate between the multiple greatest values. Therefore, the selection method may decide to stay at the present target direction 'f' since there is no unambiguous greatest likelihood value.

In FIG. 6*d*, the variability criterion is satisfied, and a greatest likelihood value may be only weakly or ambiguously determined. However, since the greatest likelihood values are asymmetrically located with respect to the bias values, the bias method may provide at least some disambiguation. Since the variability criterion is satisfied, it is possible to directly selected a target direction based on determining a greatest likelihood value, to invoke the bias method or to stay at the present target direction 'f'.

Generally, the selection method may include disambiguation based on a degree of ambiguity or significance of a greatest likelihood value being the greatest likelihood value. In case of a high degree of ambiguity, the selection method may determine to fall back to keeping the present target direction 'f'.

Figure 7:
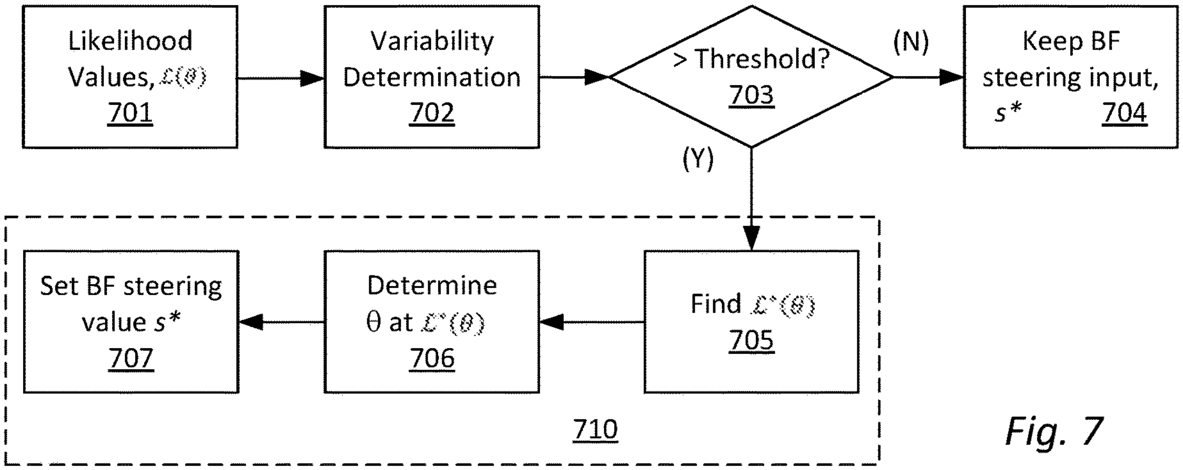
FIG. 7 shows a flowchart for a first selector method.

FIG. 7 shows a flowchart for a first selector method. The first selector method includes computing the likelihood values in step 701, wherein a likelihood value is computed for each candidate target direction. The target directions may be defined in terms of one or more of transfer functions, relative transfer functions, and steering values and the likelihood values may be computed based on one or more of transfer functions, relative transfer functions, and steering values. As mentioned herein, the likelihood values may be computed as described in EP3413589-A1 or in another way. Based on the likelihood values, the method proceeds to step 502 wherein variability of the likelihood values is determined. Computing variability may include computing one or more of: a variance of the likelihood values; an estimate of entropy of the likelihood values, e.g., an approximated estimate of entropy of the likelihood values; a difference between a greatest value among the likelihood values and an average or median value of the likelihood values; a difference between a smallest value among the likelihood values and an average or median value of the likelihood values; a sum of absolute deviations from an average value of the likelihood values; a difference between a third value and a fourth value; wherein the third value is based on one or more greatest values of the likelihood values; and wherein the fourth value is based on one or more values different from the one or more greatest values. The variability may be computed in other ways as well.

Based on the computed variability, the method proceeds to step 703 wherein the method tests if the variability value satisfies a variability criterion, e.g., a variability threshold, VTh. If the variability threshold is not exceeded (N), the method may proceed to step 704 and keep present target direction e.g., by forgoing updating the present steering input to the beamformer or by forgoing setting an updated steering input. If the variability threshold is exceeded (Y), the method may proceed to step 705, wherein the method determines a salient likelihood value e.g., a maximum likelihood value, Lmax. Based on the maximum likelihood value the method proceeds to step 706, wherein a target direction corresponding with the maximum likelihood value is determined. An output from step 706 may be a steering value, S*, or an index to a data structure, e.g., a list, storing steering values or transfer function values. Subsequently, in step 707 the beamformer is updated to set the target direction in accordance with the determined steering value or transfer function. In this way, the selector method contributes to stabilizing the beamforming target direction.

Figure 8:
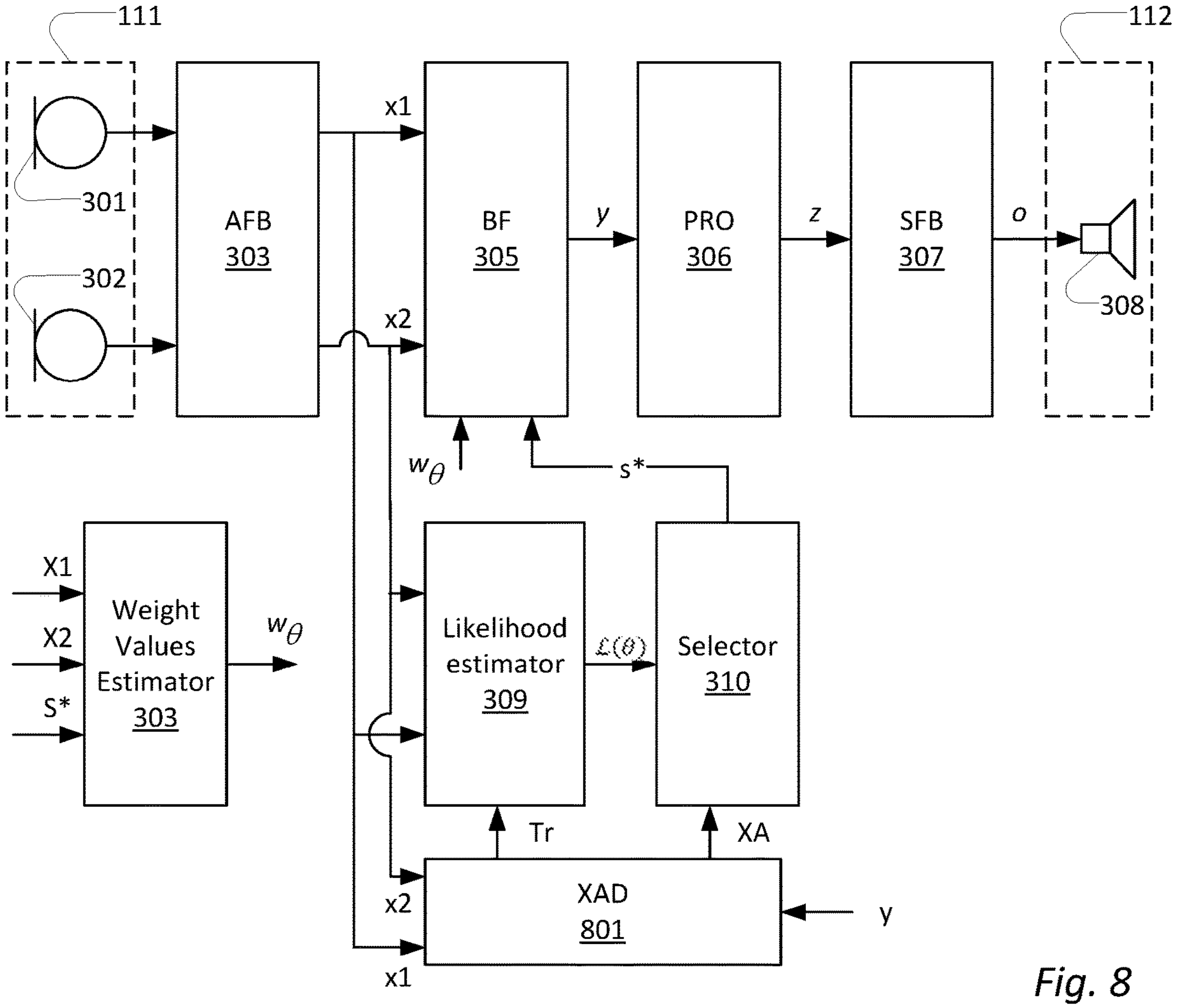
FIG. 8 shows a block diagram of a hearing aid processor including a beamformer a likelihood estimator, an entropy estimator, and an X-sound-activity-detector.

FIG. 8 shows a block diagram of a hearing aid processor including a beamformer a likelihood estimator, an entropy estimator, and an X-sound-activity-detector. FIG. 8 differs from FIG. 3 by including an X-sound-activity-detector XAD, 801 coupled to control one or both of: the likelihood estimator 309 and the selector 310. The XAD, 801 may receive the beamformed signal, Y, and/or one or both of the signals from the analysis filter-bank 303. The XAD, 801 may include a so-called Voice Activity Detector, VAD. It is noted that a person skilled in the art knows that voice activity detectors may detect voice based on detecting a sufficiently high signal level (e.g., based on absolute signal magnitude). Thus, for the sake of completeness, a VAD may detect other sounds than voice.

In some embodiments the XAD, 801 is configured to trigger calculation of the likelihood values in response to detection of the sound by sending a trigger signal, Tr, to the likelihood estimator 309 in response to detecting the sound. The likelihood estimator may receive the trigger signal, Tr, from the XAD and accordingly begin computing the likelihood values. In this way, the method may save battery power consumption.

In some embodiments, the XAD, 801 is configured to maintain a flag signal, XA, that is indicative of presence (or absence) of sound activity. The selector may read the flag signal, XA, and enable itself to update of the steering value at times when the flag signal, XA, is indicative of the presence of the sound. Otherwise, when the flag signal, XA, is indicative of absence of the sound, the selector may forgo enabling or disabling itself from updating the steering value. In this way, the target direction may be more stable.

Alternatively, or additionally, the XAD, 801 may be specifically configured to detect other sound activities than voice e.g., sound activities alternative or additional to voice activity. For instance, the XAD may include determining that another criterion than a signal level criterion is satisfied e.g., that certain value pattern show in a time-frequency representation. The XAD may be configured by tuning parameters of a neural network. The neural network may include a convolutional neural network. The parameters may be tuned by training as it is known in the art of neural networks. In some respects, training data for training a neural network include values in a time-frequency representation or in another representation labelled in accordance with presence or absence, e.g., by a binary label or in accordance with a multi-bit label e.g., including a degree of presence, of the additional or alternative sound activity.

In some embodiments, the selector 310 is configured to determine a salient likelihood value and set a corresponding steering value without determining a variability of the likelihood values and without determining if the variability satisfies a threshold. In particular, this is possible, while maintaining a stable target direction, when the sound detector XAD, 801 informs the likelihood estimator 309 and/or the selector 310 e.g., as described above e.g., by a trigger signal, Tr, and/or a flag signal, XA.

Figure 9:
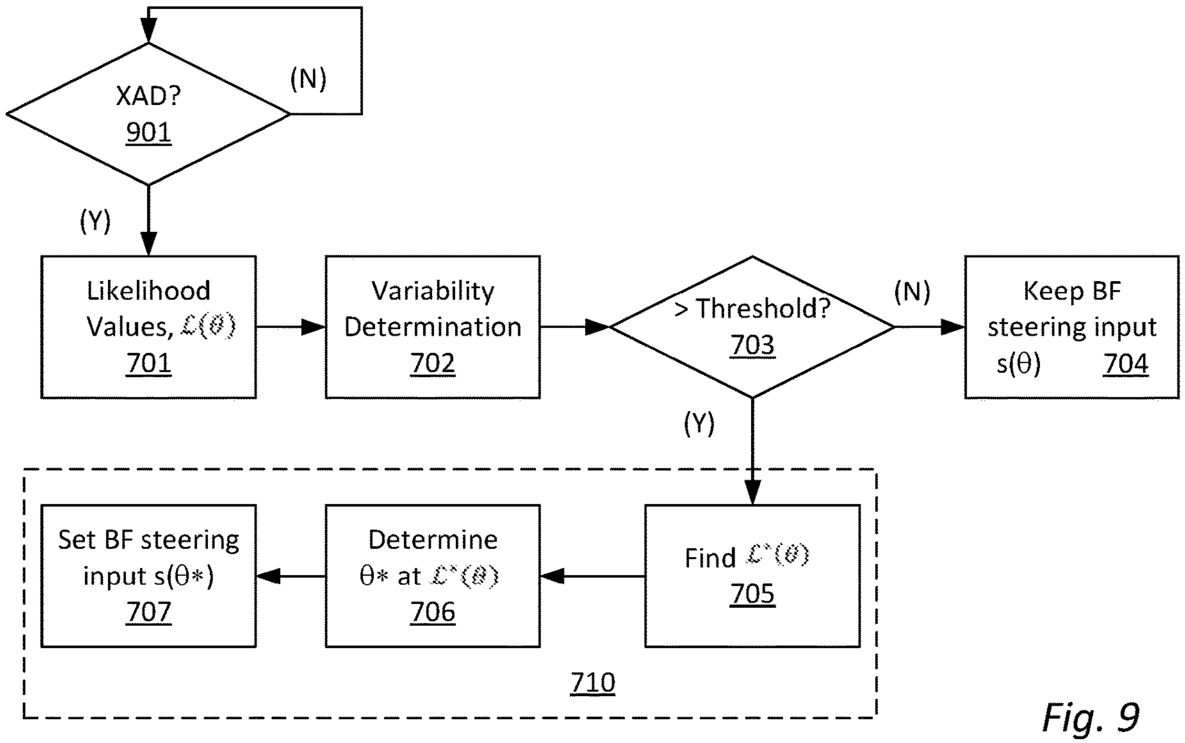
FIG. 9 shows a flowchart for a second selector method.

FIG. 9 shows a flowchart for a second selector method. FIG. 9 differs from FIG. 7 by including step 901, wherein detection of sound is performed. The detection of sound may use a Voice Activity Detector or another sound detector as described above. Step 901 may be performed recurrently e.g., at a frame rate. In response to detecting sound (Y), e.g., voice activity, the method proceeds to step 701, whereas if there is a failure to detect the sound (N), the method remains in step 901 and forgoes proceeding to step 701.

In some embodiments, the second selector method may include setting the flag signal, XA, in response to determining presence of the sound (Y) and resetting the flag signal, XA, in response to determining absence of the sound (N). In step 702, the flag may be read and one or both of the variability determination and the setting or updating of the steering value may be performed accordingly.

Figure 10:
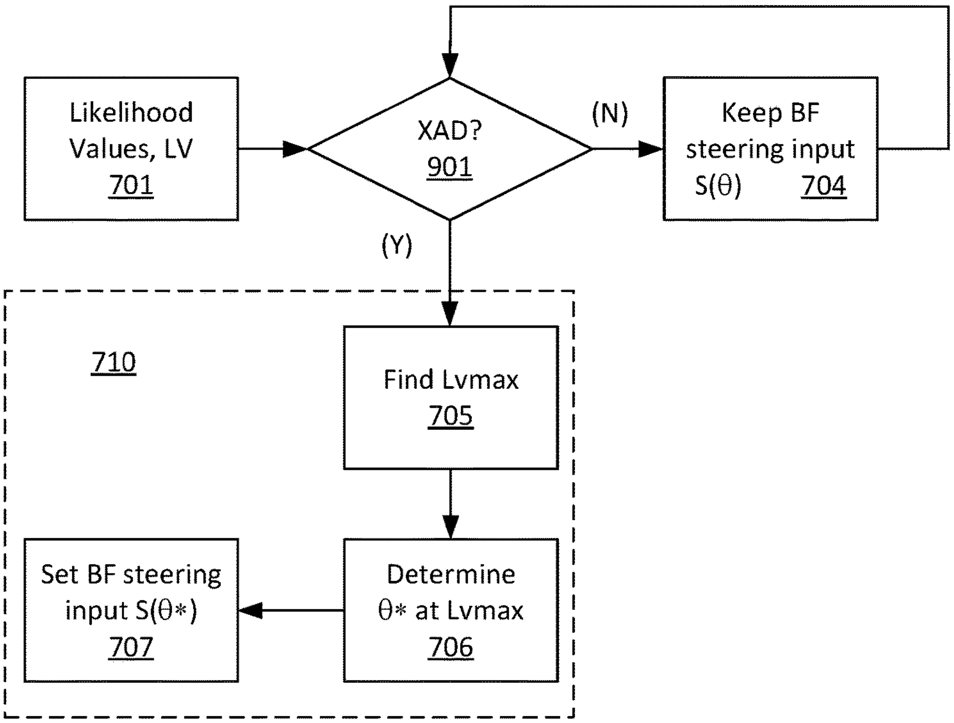
FIG. 10 shows a flowchart for a third selector method.

FIG. 10 shows a flowchart for a third selector method. In this method, the likelihood values may be computed recurringly, e.g., at a frame rate, and the method may proceed to determine if the sound activity, e.g., voice activity, is present or not in step 901. If sound activity is not present (N), the method proceeds to step 704, wherein the steering input is maintained and subsequently, the method reverts to step 901 or to step 701. In some embodiments, step 704 is not explicitly needed to maintain the target direction at a present target direction. If sound activity is detected (Y), the method proceeds to step 705 and proceeds further as described above.

Figure 11:
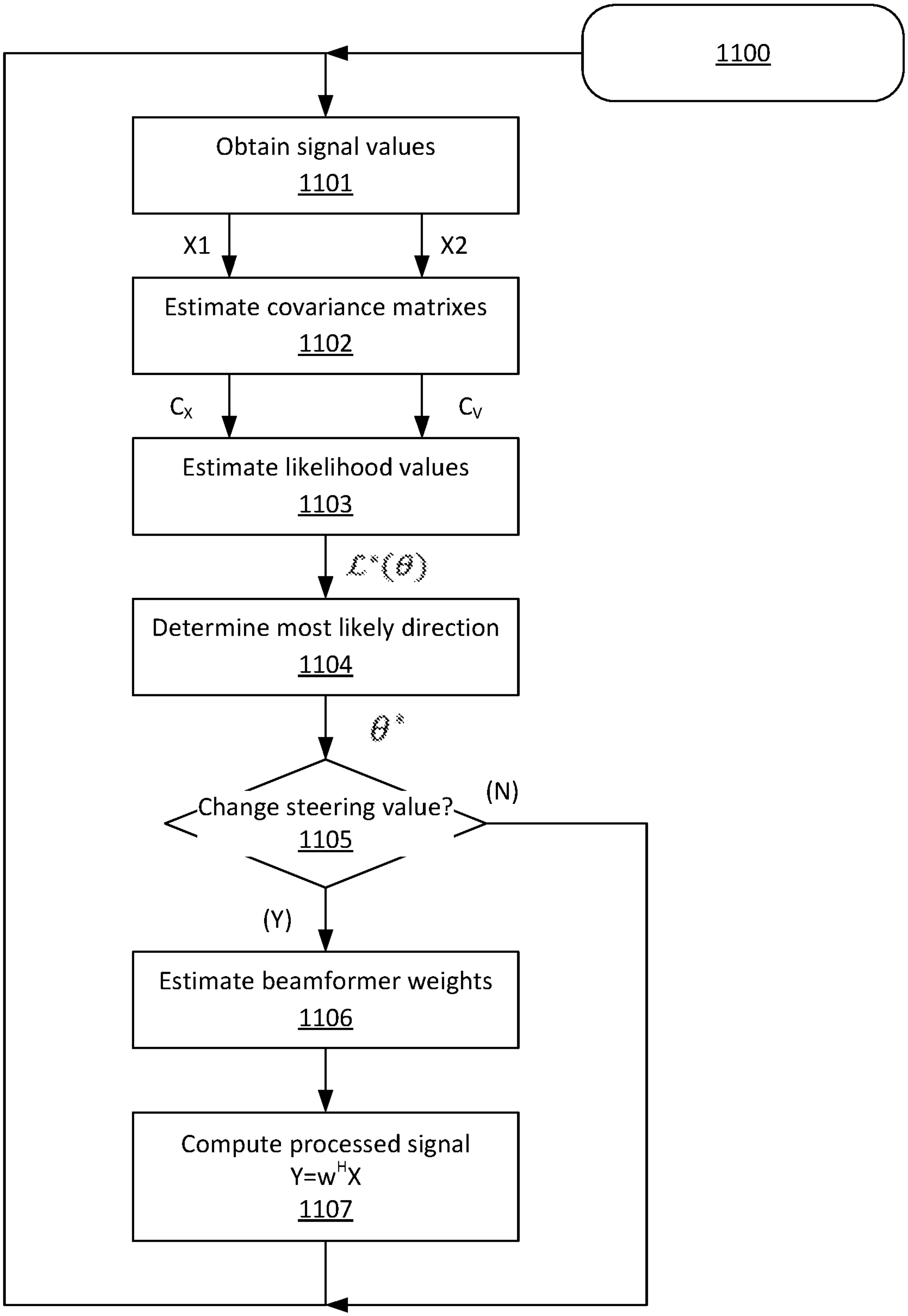
FIG. 11 shows a flowchart for a method at a hearing aid including a hearing aid processor with a beamformer.

FIG. 11 shows a flowchart for a method at a hearing aid including a hearing aid processor with a beamformer. The method relates to estimating likelihood values at step 1103 for multiple directions of arrival of sound at the microphones; determining a target direction at step 1104; estimating beamformer weights at step 1106 based on the target direction; and computing a beamformed signal at step 1108 based on the estimated beamformer weights.

As understood from the above, the microphones M1 and M2 and the analysis filter bank 303 generates time-frequency-domain signals X1 and X2. The time-frequency-domain signals include K frequency channels e.g., 16, 32 or 64 frequency channels.

In step 1102, the method computes target covariance values (Cx) based on frames determined to include a first type of sound e.g., voice activity; and computes noise covariance values (Cv) based on frames determined to not include the first type of sound. The target covariance values (Cx) and the noise covariance values (Cv) may be computed in the same way, however based on different frames.

In step 1103 and based on the target covariance values, Cx, and the noise covariance values, Cv, method proceeds to estimating likelihood values for multiple directions of arrival of sound at the microphones. The likelihood values may be computed as set out in EP3413589-A1. Alternatively, the likelihood values may be estimated as set out below:

$$\mathcal{L}(\theta) = -(M-1)\mathrm{Log}(\lambda_{V,\theta}) + \mathrm{Log}\left(\frac{\omega_\theta^H C_X(l)\omega_\theta}{\omega_\theta^H C_V(l_0)\omega_\theta}\right) - \mathrm{Log}(|C_V(l_0)|)$$

Wherein M is the number of microphones; $\lambda_{V,\theta}$ is defined in EP3413589-A1; we are the beamformer weights for the target direction θ, $\lambda_{V,\theta}$ is the time-varying power spectral density of the noise process measured at the reference microphone, $C_X$ is the inter-microphone cross power spectral density matrix of the noisy observation and $C_V$ is the noise covariance matrix; l designates the frame index, and $l_0$ denotes the most resent frame where speech is absent; and superscript H designates the Hermetian matrix transposition.

For two microphone inputs, the likelihood values may be estimated as set out below:

$$\mathcal{L}(\theta) = +/-\mathrm{Log}\left(\frac{\omega_\theta^H(l)C_X(l)\omega_\theta(l)}{\omega_\theta^H(l)C_V(l_0)\omega_\theta(l)}\right)$$

Alternatively, for two microphone inputs, the likelihood values may be estimated as set out below:

$$\mathcal{L}(\theta) = \mathrm{Log}\left(\frac{b_\theta^H C_X(l)b_\theta}{b_\theta^H C_V(l_0)b_\theta}\right)$$

Wherein b is the so-called blocking matrix which is signal-independent and therefore may be pre-computed and stored in the memory.

In step 1104, a most likely direction of arrival may be determined by determining the greatest likelihood value and based on the greatest likelihood value, determining the most likely direction of arrival, $\theta^*$.

In step 1105 the method determines, based on a criterion, whether to update the steering value and change the target direction of the beamformer based on e.g., computing an entropy value, or another value representing variability, for the likelihood values. If the criterion fails to be satisfied (N), the method reverts to estimate likelihood values.

If the criterion is satisfied (Y), e.g., by the entropy exceeding a threshold, the method proceeds to compute beamformer weights, w, in step 1106 based on the determined most likely direction, represented by $\theta^*$ and/or $D_\theta$.

Based on the beamformer weights, the method proceeds to step 1107 wherein the directional signal Y is computed e.g., based on $Y=w^H X$.

The method may also post-filtering, wherein the directional signal is filtered e.g., to suppress noise in accordance with adaptively and/or dynamically determined gain values.

It should be noted that the likelihood values may be computed for each of multiple frequency channels. Correspondingly, the target covariance values, Cx, and the noise covariance values, Cv, are computed for each of the multiple frequency channels. Thus, the method may be configured to perform the steps for elected or all of multiple frequency bands.

Figure 12:
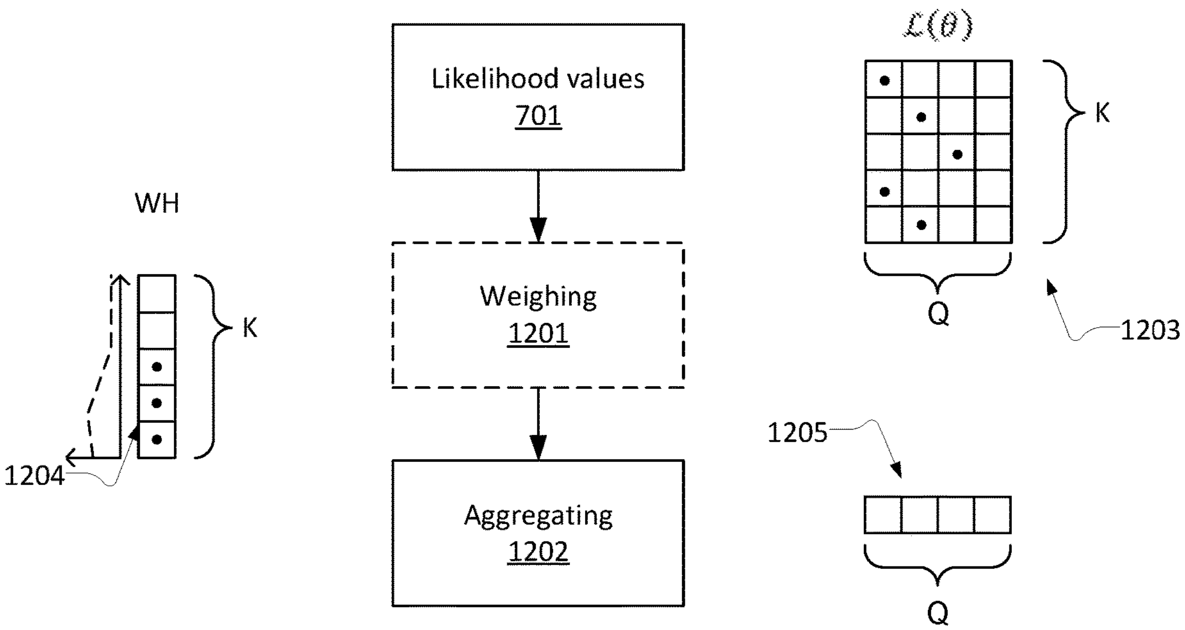
FIG. 12 shows a flowchart for a selector method wherein likelihood values are provided at multiple frequency bands.

FIG. 12 shows a flowchart for a selector method wherein likelihood values are provided at multiple frequency bands. The selector method is configured to determine the target direction that most of the frequency bands agree to in respect of a maximum likelihood value. The likelihood values, $\mathcal{L}(\theta)$, may include a likelihood value for each of K frequency bands and for each of Q directions of arrival. The likelihood values are shown in a matrix structure 1203. The dots shown in the matrix structure 1203 depicts example locations of greatest likelihood values.

In one embodiment, the method may proceed to step 1202 wherein a most likely target direction is determined based on aggregating the likelihood values, e.g., by summing, across all K frequency bands or across elected frequency bands among the K frequency bands to obtain an aggregated value for each target direction. The aggregated values are designated 1205. The greatest aggregated value may then be determined, and the corresponding target direction may be used as a steering value for setting the target direction of the beamformer.

In another embodiment, the method may proceed to step 1202 wherein, however, a voting rule is applied to select the target direction at which the most frequency bands indicate a greatest likelihood value. The method may include forgoing determining a target direction if the voting rule is not able to determine select a target direction e.g., in case of determining an equal amount of a greatest amount of votes for different target directions.

In yet another embodiment, the method may include step 1201, wherein frequency-band specific weighing values, WH, are applied to the likelihood values before performing step 1202 e.g., based on aggregating the likelihood values in accordance with the weighting values. The weighing values, WH, may be represented in a matrix or vector structure, 1204. In some respects, the weighing values serves to elect and/or weigh the likelihood values. In some respects, the weighing values emphasizes the likelihood values in speech frequency bands.

The selector method may be performed in advance of, or before, determining variability of the likelihood values. The selector method may be performed in accordance with a determination that the variability of the likelihood values satisfies the variability criterion.

Figure 13:
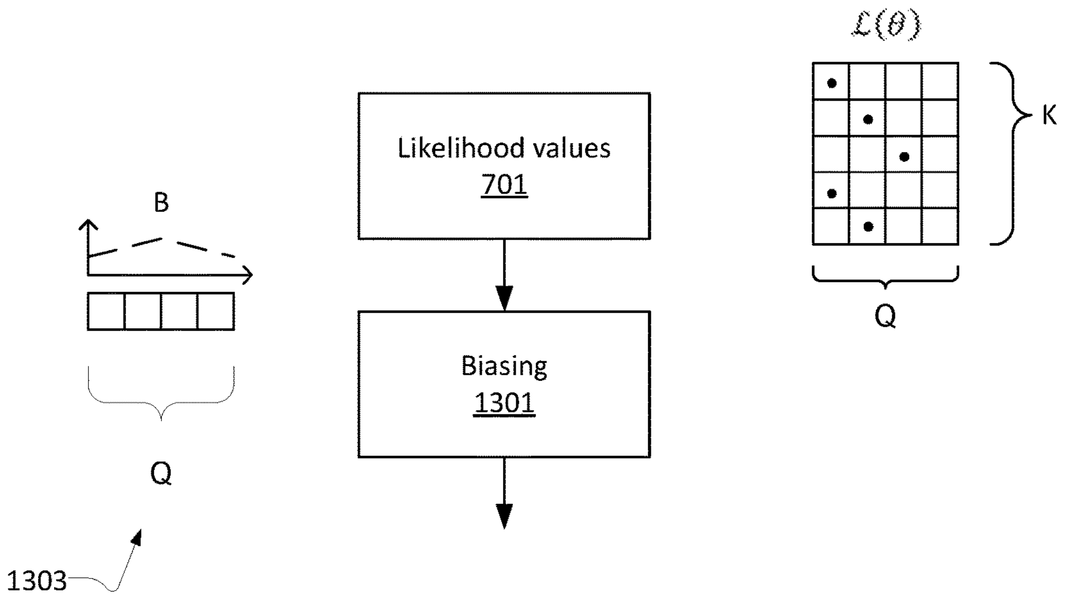
FIG. 13 shows a flowchart for a bias method wherein bias values are applied to the likelihood values.

FIG. 13 shows a flowchart for a bias method wherein bias values are applied to the likelihood values. The bias method is configured to drive a target direction towards a preferred direction, e.g., in front of the hearing aid user, at least in response to determining a small variability of the likelihood values.

As mentioned above, the likelihood values, $\mathcal{L}(\theta)$, may include a likelihood value for one frequency band of for each of K frequency bands and for each of Q directions of arrival.

In one embodiment, the bias method proceeds to step 1301 to apply bias values, B, to the likelihood values. The bias values may be applied by modifying the bias values or by augmenting the likelihood values by the bias values.

The method then proceeds to select a target direction, $\theta^*$, based on the likelihood values and the bias values. A determination to change the steering value may be based on variability of the likelihood values or likelihood values with applied bias values e.g., before or after applying the bias values.

In some embodiments, subsequently to applying the bias values, B, the method may proceed to apply the weighing values, WH, e.g., as described above. Alternatively, the weighing values may be applied before applying the bias values.

Figure 14A:
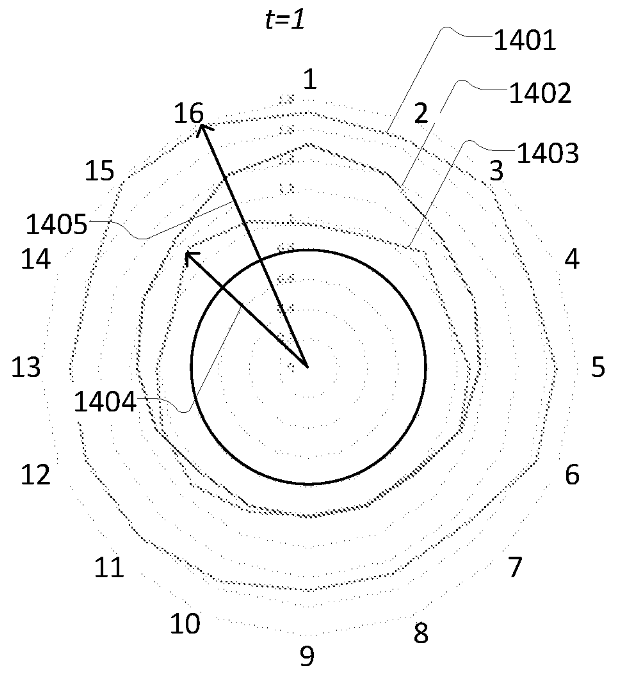
FIGS. 14*a* and 14*b* show radar diagrams including example likelihood values and bias values.
Figure 14B:
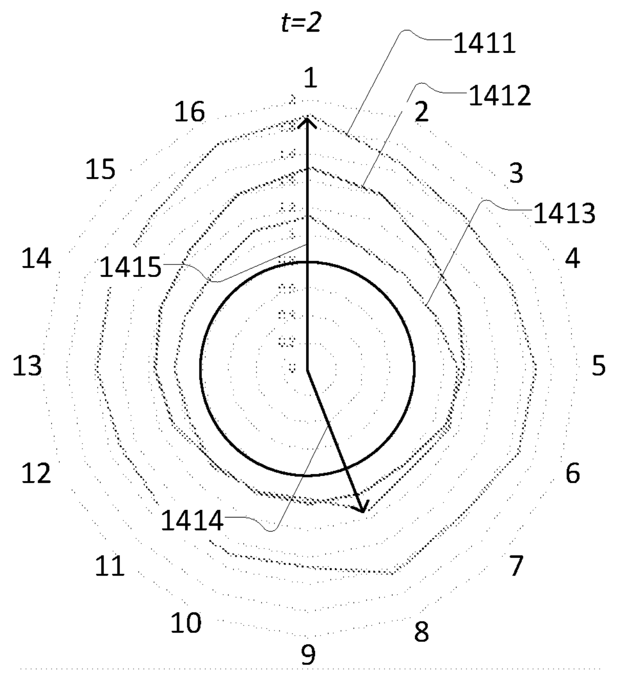

FIGS. 14*a* and 14*b* show radar diagrams including example likelihood values and bias values. The diagrams illustrate values associated with spatial indications enumerated 1 through 16. Generally, the diagrams show greater values away from the centre of the diagram. The values are interconnected with lines to form a shape, which is for illustration only.

In FIG. 14*a* likelihood values 1403 may correspond with the likelihood values shown in FIG. 6*a* (although the values are not shown to scale). It may be determined that the spatial indication enumerated '15' at arrow 1404 exhibits a greatest likelihood value among the likelihood values. However, the variability of all the likelihood values may be lower than a threshold value. The bias values 1402 are shown to have greater values towards the top-centre of the radar diagram e.g., to bias selection of a direction in front-centre of the user. Applying the bias values 1402 to the likelihood values 1403 may result in the values 1401, wherein a greatest value is located at arrow 1405. The greatest value at arrow 1405 is thus located closer to the front-centre of the user than the likelihood values would suggest alone.

FIG. 14*b* depicts likelihood values 1413 and bias values 1412 in a similar way as in FIG. 14*a*. As seen from the values 1411, wherein bias values 1412 are applied to the likelihood values 1413, a greatest value is located at arrow 1411 despite the likelihood values may suggest a greatest value at arrow 1414, which is at a very different direction.

Thus, the bias values may drive selection of a target direction e.g., in front of the user or at another direction.

The bias values may be similar or identical for two or more frequency bands e.g., identical for all frequency bands.

The likelihood values illustrated may be associated broadly with all frequencies or they may be associated with a specific frequency band. The likelihood values may be obtained by weighing and summing likelihood values from multiple frequency bands.

Figure 15:
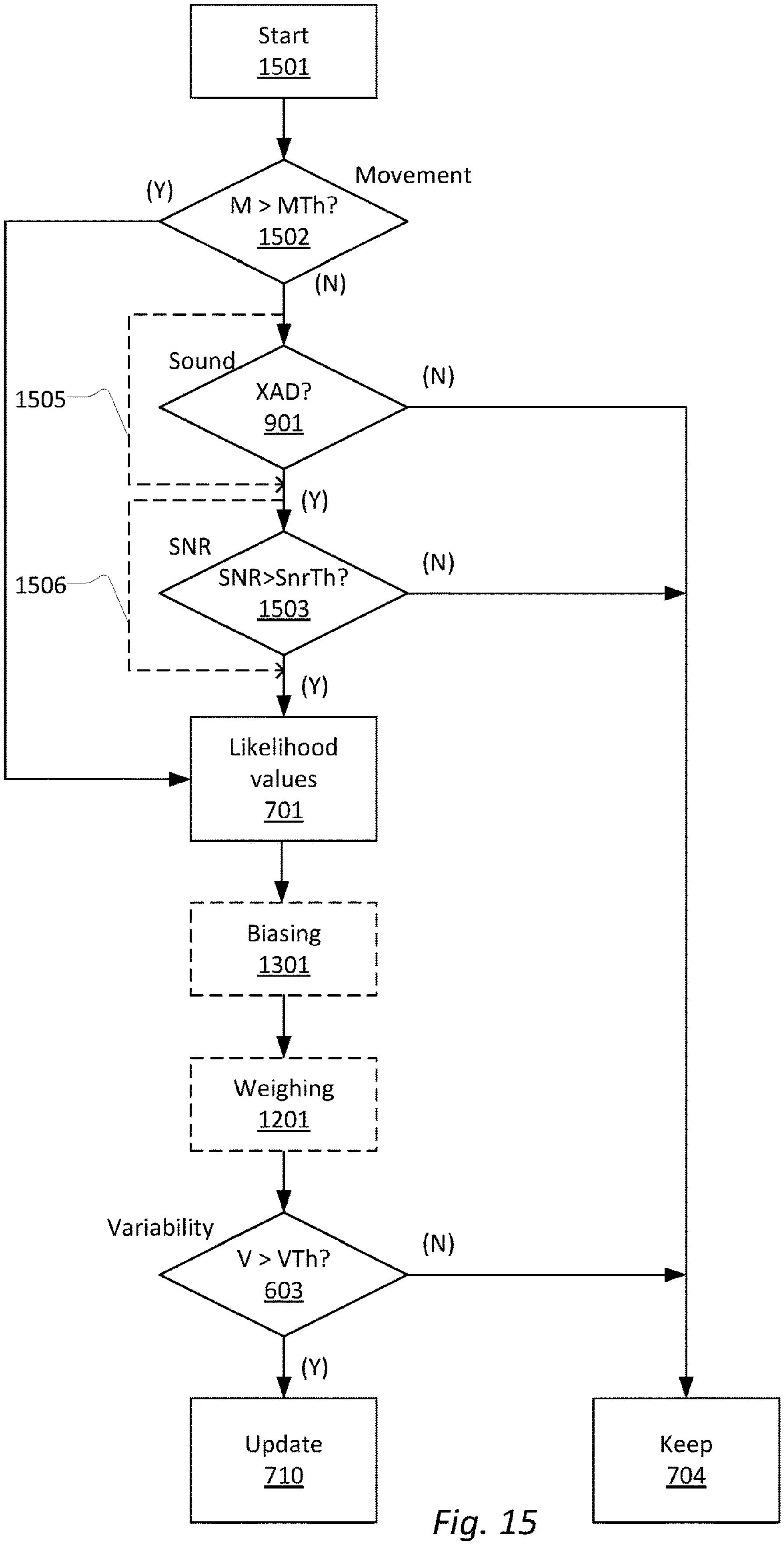
FIG. 15 shows a flowchart for a selector method including one or more criteria.

FIG. 15 shows a flowchart for a selector method including one or more criteria. The method starts in step 1501 e.g., in response to a trigger signal e.g., starting the method every frame or every N'th frame. A motion criterion includes determining in step 1502 whether a level of a motion signal obtained from the motion sensor satisfies a motion criterion e.g., by exceeding a motion threshold. Rather than determining a level of the motion signal, the intensity of the motion may be determined based on the motion signal e.g., by counting motion events. If the motion satisfies the motion criterion (Y), the method proceeds to step 701 wherein likelihood values are computed. The motion criterion may be satisfied if motion has occurred subsequently to when the likelihood values were most recently computed. Alternatively, if the motion fails (N) to satisfy the motion criterion in step 1502, the method proceeds to determine if one or both of a sound criterion, e.g., a voice activity criterion is satisfied, in step 901 and a signal-to-noise criterion is satisfied in step 1503. If the sound criterion or the signal-to-noise criterion fails, the method proceeds to step 704 to keep the present target direction and not update the steering value.

However, if both of the sound criterion and the signal-to-noise criteria are satisfied, the method proceeds to calculate likelihood values in step 701. Based on the likelihood values computed in step 701, the method proceeds to apply the bias values to the likelihood values in step 1301 and to apply the weighing in step 1201. However, one or both of the biasing and the weighing may be omitted or forgone by the method. Subsequently, the method proceeds to step 603 to test if the variability of the biased likelihood values exceeds a variability criterion. If the variability criterion is satisfied, e.g., by the variability of the biased likelihood values exceeding a variability threshold, VTh, the method proceeds to step 710 to update the steering value (cf. also FIG. 7). Alternatively, if the variability criterion fails to be satisfied (N), the method proceeds to keep the steering value in step 704 (cf. FIG. 7).

In some embodiments however, step 603 proceeds step 1301 such that step 1301 is performed if the variability criterion in step 603 is performed. Otherwise, the method may forgo the biasing.

In some embodiments, step 901 is omitted or by-passed as shown by dashed line 1505.

In some embodiments, step 1503 is omitted or by-passed as shown by dashed line 1506.

Additional Aspects

In an embodiment, the hearing aid comprises a (single channel) post filter for providing further noise reduction (in addition to the spatial filtering of the beamformer filtering unit), such further noise reduction being e.g., dependent on estimates of SNR of different beam patterns on a time frequency unit scale, e.g., as disclosed in EP2701145-A1.

The spatial location of a beam may not be explicitly defined but is at least implicitly defined via the beamforming including steering vector values. Also, beamformer weight values may define the spatial location of a beam.

The one or more processors may include one or more integrated circuits embodied on one or more integrated circuit dies. The one or more processors may include one or more of: one or more analysis filter banks, one or more synthesis filter banks, one or more beamformers, one or more units configured to generate a compensation for a hearing loss, e.g., a prescribed hearing loss, one or more controller units, and one or more post-filters. The analysis filter banks may convert a time-domain signal to a time-frequency domain signal. The synthesis filter banks may convert a time-frequency domain signal to a time-domain signal. The post-filter may provide time-domain filtering and/or time-frequency domain filtering. The controller may be configured to control portions or units of the one or more processors and/or a transmitter/receiver/transceiver e.g., based on one or more programs, e.g., in response to signals from one or more hardware elements configured for receiving user inputs. The compensation for a hearing loss may be quantified during a fitting session, e.g., a remote fitting session. The one or more processors may be configured to execute instructions stored in the memory and/or stored in the processor.

The output unit may comprise one or more of: one or more amplifiers, one or more loudspeakers, e.g., miniature loudspeakers, one or more wireless transmitters, e.g., including transceivers.

In the present context, a hearing aid, e.g., a hearing instrument, refers to a device, which is adapted to improve, augment and/or protect the hearing capability of a user by receiving acoustic signals from the user's surroundings, generating corresponding audio signals, possibly modifying the audio signals, and providing the possibly modified audio signals as audible signals to at least one of the user's ears. Such audible signals may e.g., be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g., acoustically, electrically or optically) with each other. The loudspeaker may be arranged in a housing together with other components of the hearing aid or may be an external unit in itself (possibly in combination with a flexible guiding element, e.g., a dome-like element).

A hearing aid may be adapted to a particular user's needs, e.g., a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g., an audiogram, using a fitting rationale (e.g. adapted to speech). The frequency and level dependent gain may e.g., be embodied in processing parameters, e.g., uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g., a music player, a wireless communication device, e.g., a mobile phone (such as a smartphone) or a tablet or another device, e.g. comprising a graphical interface. Hearing aids, hearing systems or binaural hearing systems may e.g., be used for compensating for a hearing-impaired person's loss of hearing capability, augmenting, or protecting a normal-hearing person's hearing capability and/or conveying electronic audio signals to a person. Hearing aids or hearing systems may e.g., form part of or interact with public-address systems, active ear protection systems, handsfree telephone systems, car audio systems, entertainment (e.g., TV, music playing or karaoke) systems, teleconferencing systems, classroom amplification systems, etc.

Other methods and hearing aids are defined by the below items. Aspects and embodiments of the other methods and hearing aids defined by the below items include the aspects and embodiments presented in the summary section.

1. A method performed by a hearing aid including one or more processors, a memory, two or more microphones, and an output transducer; wherein the memory includes bias values corresponding with first values, and wherein the bias values include at least a first bias value; comprising:

generating a first processed signal based on input signals from the two or more microphones and at least one steering input value; wherein a first target direction associated with the beamforming is responsive to a first steering value;

supplying a signal to the output transducer based on the first processed signal;

for each steering value, comprised by multiple steering values, computing a first value; wherein the first value is associated with a likelihood of an acoustic sound signal arriving from the target direction associated with the steering value;

determining at least one salient first value among the multiple first values and determining a steering value associated with the at least one salient first value;

before determining at least one salient first value among the multiple first values, changing at least one of the first values based on the at least one first bias value; or determining the at least one salient first value based on the first values and the bias values corresponding with the first values; and generating the first processed signal (y) based on the steering value (s*) associated with the at least one salient first value ($\mathcal{L}^*(\theta)$).

2. A method performed by a hearing aid including one or more processors, a memory, two or more microphones, and an output transducer comprising:

generating a first processed signal based on input signals from the two or more microphones and at least one steering input value; wherein a first target direction associated with the beamforming is responsive to a first steering value;

supplying a signal to the output transducer based on the first processed signal;

for each steering value, comprised by multiple steering values, computing a first value; wherein the first value is associated with a likelihood of an acoustic sound signal arriving from the target direction associated with the steering value;

determining at least one salient first value among the multiple first values and determining a steering value associated with the at least one salient first value; and determining a signal-to-noise ratio value based on the first processed signal;

determining that the signal-to-noise ratio value satisfies a third criterion and accordingly:

determining to change the first steering value; and generating the first processed signal (y) based on the steering value (s*) associated with the at least one salient first value ($\mathcal{L}^*(\theta)$).

3. A method performed by a hearing aid including one or more processors, a memory, two or more microphones, and an output transducer; wherein a fifth criterion defines a first type of sound activity; comprising:

generating a first processed signal based on input signals from the two or more microphones and at least one steering input value; wherein a first target direction associated with the beamforming is responsive to a first steering value;

supplying a signal to the output transducer based on the first processed signal;

for each steering value, comprised by multiple steering values, computing a first value; wherein the first value is associated with a likelihood of an acoustic sound signal arriving from the target direction associated with the steering value;

determining at least one salient first value among the multiple first values and determining a steering value associated with the at least one salient first value; and based on one or more of: at least one of the input signals and the first processed signal, determining that the fifth criterion is satisfied; and in response to determining that the fifth criterion is satisfied:

determining to change the first steering value; and generating the first processed signal (y) based on the steering value (s*) associated with the at least one salient first value ($\mathcal{L}^*(\theta)$).

4. A method performed by a hearing aid including one or more processors, a memory, two or more microphones, a motion sensor e.g., an accelerometer, generating a motion signal, and an output unit; comprising:

generating a first processed signal based on input signals from the two or more microphones and at least one steering input value; wherein a first target direction associated with the beamforming is responsive to a first steering value; supplying a signal to the output transducer based on the first processed signal;

determining a change based on the motion signal from the motion sensor, and accordingly:

in response to determining the change, for each steering value, comprised by multiple steering values, computing a first value; wherein the first value is associated with a likelihood of an acoustic sound signal arriving from the target direction associated with the steering value;

determining at least one salient first value among the multiple first values and determining a steering value associated with the at least one salient first value;

determining to change the first steering value; and generating the first processed signal (y) based on the steering value (s*) associated with the at least one salient first value ($\mathcal{L}^*(\theta)$).

5. A hearing aid according to any of the preceding items, comprising:

one or more processors; one or more microphones; and an output unit; wherein the processor is configured to perform the method.

6. A hearing aid including one or more processors, a memory, two or more microphones, and an output transducer; wherein the memory includes bias values corresponding with first values, and wherein the bias values include at least a first bias value; wherein the hearing aid is configured to:

generate a first processed signal based on input signals from the two or more microphones and at least one steering input value; wherein a first target direction associated with the beamforming is responsive to a first steering value;

supply a signal to the output transducer based on the first processed signal;

for each steering value, comprised by multiple steering values, compute a first value; wherein the first value is associated with a likelihood of an acoustic sound signal arriving from the target direction associated with the steering value;

determine at least one salient first value among the multiple first values and determine a steering value associated with the at least one salient first value;

before determining at least one salient first value among the multiple first values, change at least one of the first values based on the at least one first bias value; or determine the at least one salient first value based on the first values and the bias values corresponding with the first values; and generate the first processed signal (y) based on the steering value (s*) associated with the at least one salient first value ($\mathcal{L}^*(\theta)$).

7. A hearing aid including one or more processors, a memory, two or more microphones, and an output transducer; wherein the hearing aid is configured to:

generate a first processed signal based on input signals from the two or more microphones and at least one steering input value; wherein a first target direction associated with the beamforming is responsive to a first steering value;

supply a signal to the output transducer based on the first processed signal;

for each steering value, comprised by multiple steering values, compute a first value; wherein the first value is associated with a likelihood of an acoustic sound signal arriving from the target direction associated with the steering value;

determine at least one salient first value among the multiple first values and determine a steering value associated with the at least one salient first value; and determine a signal-to-noise ratio value based on the first processed signal;

determine that the signal-to-noise ratio value satisfies a third criterion and accordingly:

determine to change the first steering value; and generate the first processed signal (y) based on the steering value (s*) associated with the at least one salient first value ($\mathcal{L}^*(\theta)$).

8. A hearing aid including one or more processors, a memory, two or more microphones, and an output transducer; wherein a fifth criterion defines a first type of sound activity; wherein the hearing aid is configured to:

generate a first processed signal based on input signals from the two or more microphones and at least one steering input value; wherein a first target direction associated with the beamforming is responsive to a first steering value;

supply a signal to the output transducer based on the first processed signal;

for each steering value, comprised by multiple steering values, compute a first value; wherein the first value is associated with a likelihood of an acoustic sound signal arriving from the target direction associated with the steering value;

determine at least one salient first value among the multiple first values and determining a steering value associated with the at least one salient first value; and based on one or more of: at least one of the input signals and the first processed signal, determine that the fifth criterion is satisfied; and in response to the determination that the fifth criterion is satisfied:

determine to change the first steering value; and generate the first processed signal (y) based on the steering value (s*) associated with the at least one salient first value ($\mathcal{L}^*(\theta)$).

9. A hearing aid including one or more processors, a memory, two or more microphones, a motion sensor e.g., an accelerometer, generating a motion signal, and an output unit; wherein the hearing aid is configured to:

generate a first processed signal using beamforming based on input signals from the two or more microphones and at least one steering input value; wherein a first target direction associated with the beamforming is responsive to a first steering value;

supply a signal to the output transducer based on the first processed signal;

determine a change based on the motion signal from the motion sensor, and accordingly:

in response to the determination to the change, for each steering value, comprised by multiple steering values, compute a first value; wherein the first value is associated with a likelihood of an acoustic sound signal arriving from the target direction associated with the steering value;

determine at least one salient first value among the multiple first values and determining a steering value associated with the at least one salient first value;

determine to change the first steering value; and generate the first processed signal (y) based on the steering value (s*) associated with the at least one salient first value ($\mathcal{L}(\theta)$).

The invention claimed is:

1. A method performed by a hearing aid including one or more processors, a memory, two or more microphones, and an output transducer; comprising:

generating a first processed signal (y) based on input signals from the two or more microphones and a steering value; wherein a target direction is associated with the steering value;

supplying a signal (o) to the output transducer based on the first processed signal (y);

for each steering value (s; d), comprised by multiple steering values, computing a first value ($\mathcal{L}(\theta)$); wherein the first value ($\mathcal{L}(\theta)$) is associated with a likelihood of an acoustic sound signal arriving from the target direction associated with the steering value;

determining at least one salient first value ($\mathcal{L}$*(θ)) among the multiple first values and determining a steering value (s*) associated with the at least one salient first value ($\mathcal{L}$*(θ));

computing a second value (H(θ)) associated with variability of at least some of the multiple first values;

determining to change the first steering value (s*) in response to a determination that the second value (H(θ)) satisfies at least a first criterion; and accordingly:

generating the first processed signal (y) based on the steering value (s*) associated with the at least one salient first value ($\mathcal{L}$*(θ)).

2. A method according to claim 1, wherein the second value is computed based on one or more of:

a variance of the first values;

an estimate of entropy (H(θ)) of the first values, e.g., an approximated estimate of entropy (H(θ)) of the first values;

a difference between a greatest value among the first values and an average or median value of the first values;

a difference between a smallest value among the first values and an average or median value of the first values;

a sum of absolute deviations from an average value of the first values;

a difference between a third value and a fourth value; wherein the third value is based on one or more greatest values of the first values; and wherein the fourth value is based on one or more values different from the one or more greatest values.

3. A method according to claim 1, wherein the first processed signal is generated using one or both of:

beamforming based on input signals from the two or more microphones and the steering value, and spatial filtering based on input signals from the two or more microphones and the steering value.

4. A method according to claim 1, comprising:

for one or more elected frequency bands comprised by multiple frequency bands:

computing the first values;

determining at least one salient first value ($\mathcal{L}$*(θ)) among the multiple first values; and setting the first steering value (s*) as a common value at least for the one or more elected frequency bands based on the steering value (s) associated with the at least one salient first value ($\mathcal{L}$*(θ)) for each of the one or more elected frequency bands.

5. A method according to claim 1, comprising:

determining to change the first steering value (s*) based on a determination that at least two of the salient first values ($\mathcal{L}$*(θ)) at different frequency bands agrees to a common value.

6. A method according to claim 1, comprising:

for each of two or more elected frequency bands of multiple frequency bands:

computing the first values ($\mathcal{L}$(θ));

computing the second value (H(θ));

determining to change the first steering value (s*) in response to a determination that, for each of the two or more elected frequency bands, the second value (H(θ)), satisfies the first criterion, or determining to change the first steering value (s*) in response to a determination that, a predefined number of second values (H(θ)) satisfies the first criterion.

7. A method according to claim 1, comprising:

applying weighing values (WH) to the first values to obtain modified first values; wherein each weighing value is associated with a frequency band;

wherein the second value (H(θ)) is associated with variability of the modified first values.

8. A method according to claim 1, wherein the memory includes bias values (B) corresponding with the first values, and wherein the bias values include at least a first bias value; comprising:

before determining at least one salient first value ($\mathcal{L}$*(θ)) among the multiple first values, changing at least one of the first values based on the at least one first bias value; or determining the at least one salient first value ($\mathcal{L}$*(θ)) based on the first values and the bias values corresponding with the first values.

9. A method according to claim 1, wherein the memory includes bias values corresponding with the first values, and wherein the bias values include at least a first bias value; comprising:

applying at least the first bias value to at least some first values; wherein the at least some first values is/are associated with a first target direction; wherein the first target direction is a pre-set target direction.

10. A method according to claim 1, wherein the memory includes bias values corresponding with the first values, and wherein the bias values include at least a first bias value, comprising:

determining a signal-to-noise ratio value based on the first processed signal;

determining that the signal-to-noise ratio value fails to satisfy a third criterion and accordingly:

augmenting at least some of the first values to include biased first values at least for values associated with a pre-set target direction; or changing at least one first value of the first values based on and corresponding with the at least one first bias value.

11. A method according to claim 1, wherein the memory includes bias values (B) corresponding with the first values; the method comprising:

in accordance with a determination that the second value (H(θ)) fails to satisfy the first criterion:

applying bias values to at least some first values associated with a first spatial indication; wherein the first spatial indication is a pre-set spatial indication.

12. A method according to claim 1, wherein the hearing aid includes a motion sensor, e.g., an accelerometer, generating a motion signal; the method comprising:

determining a change based on the motion signal from the motion sensor, and accordingly:

in response to determining the change, computing the multiple first values including a first value ($\mathcal{L}$(θ)) for each spatial indication (θ) comprised by multiple spatial indications.

13. A method according to claim 1, wherein the hearing aid includes a motion sensor, generating a motion signal; and wherein the memory includes bias values (B) corresponding with the first values; the method comprising:

determining, based on the motion signal, that a motion of the hearing aid exceeds a fourth criterion, and accordingly:

applying bias values to at least some of the first values to include biased values at least for values associated with a first spatial indication (θ**); or forgo applying bias values e.g., including resetting, the first values to not include biased values at least for values associated with the pre-set spatial indication.

14. A method according to claim 1, comprising:
determining a change based on one or more of: at least one of the input signals from the two or more microphones and the first processed signal, and accordingly:
in response to determining the change, computing the multiple first values including the first value ($\mathcal{L}(\theta)$) for each steering value comprised by the multiple steering values.

15. A method according to claim 1, wherein determining the one or more salient first values ($\mathcal{L}^*(\theta)$) is performed in response to determining to change the steering value (s).

16. A method according to claim 1, wherein a fifth criterion defines a first type of sound activity; the method comprising:
based on one or more of: at least one of the input signals and the first processed signal, determining that the fifth criterion is satisfied; and
in response to determining that the first criterion and the fifth criterion are satisfied:
setting the first steering value (s*) based on the steering value (s) associated with the at least one salient first value ($\mathcal{L}^*(\theta)$).

17. A method according to claim 1,
wherein the memory stores a data structure including, for each steering value, one or more values for an estimated transfer function;
wherein, for each steering value, the first value ($\mathcal{L}(\theta)$) is computed based on input signals from the two or more microphones and the values for an estimated transfer function.

18. A method according to claim 1, wherein a fifth criterion defines a first type of sound activity, comprising:
detecting sound activity associated with the first type of sounds based on at least the fifth criterion;
estimating first covariance values (Cx) based on detecting the first type of sounds and estimating second covariance values (Cv) based on failure to detect the first type of sounds;
based on the value of the steering input value, estimating beamformer weight values ($w_\theta$);
wherein the first value ($\mathcal{L}(\theta)$) is computed for each spatial indication ($\theta$) based on: the first covariance value, the second covariance value, and the representation of the estimated transfer function ($d(\theta)$).

19. A method according to claim 1, wherein the hearing aid is a first hearing aid, comprising:
receiving eight values ($\mathcal{L}(\theta)$) from a second hearing aid, used in conjunction with the first hearing aid; wherein the eight values are likelihood values from the second hearing aid;
wherein the spatial indication associated with a salient first value ($\mathcal{L}^*(\theta)$) is obtained by including the eight values in determining the salient first value; and
transmitting the spatial indication associated with a salient first value and obtained by including the eight values in determining the salient first value to the second hearing aid.

20. A hearing aid according to claim 1, comprising:
one or more processors; one or more microphones; and an output unit;
wherein the processor is configured to perform the method set out in any of the preceding claims.

* * * * *